(12) United States Patent  (10) Patent No.: US 7,730,446 B2
Anonsen et al.  (45) Date of Patent: Jun. 1, 2010

(54) SOFTWARE BUSINESS PROCESS MODEL

(75) Inventors: Steven P. Anonsen, Fargo, ND (US);
Timothy J. Brookins, West Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 1670 days.

(21) Appl. No.: 10/389,670

(22) Filed: Mar. 12, 2003

(65) Prior Publication Data

US 2004/0181775 A1 Sep. 16, 2004

(51) Int. Cl.
*G06F 9/44* (2006.01)
*G06F 9/45* (2006.01)

(52) U.S. Cl. .............. 717/104; 717/102; 717/107; 717/108; 717/137; 717/139

(58) Field of Classification Search .......... 717/100–122
See application file for complete search history.

(56) References Cited

U.S. PATENT DOCUMENTS

| | | | |
|---|---|---|---|
| 5,872,973 A | 2/1999 | Mitchell et al. | 719/332 |
| 5,999,911 A | 12/1999 | Berg | 705/9 |
| 6,012,067 A | 1/2000 | Sarkar | 707/103 R |
| 6,014,666 A | 1/2000 | Helland et al. | 707/9 |
| 6,018,627 A * | 1/2000 | Iyengar et al. | 717/103 |
| 6,085,198 A | 7/2000 | Skinner et al. | 707/103 R |
| 6,158,044 A * | 12/2000 | Tibbetts | 717/100 |
| 6,167,564 A | 12/2000 | Fontana et al. | 717/104 |
| 6,253,251 B1 | 6/2001 | Benantar et al. | 719/315 |
| 6,301,585 B1 | 10/2001 | Milne | 707/103 R |
| 6,370,681 B1 | 4/2002 | Dellarocas et al. | 717/110 |
| 6,393,474 B1 | 5/2002 | Eichert et al. | 709/223 |
| 6,405,364 B1 | 6/2002 | Bowman-Amuah | 717/101 |
| 6,471,068 B1 | 10/2002 | Kido et al. | 707/103 R |
| 6,473,791 B1 | 10/2002 | Al-Ghosein et al. | 709/217 |
| 6,553,377 B1 | 4/2003 | Eschelbeck et al. | 707/10 |
| 6,587,849 B1 | 7/2003 | Mason et al. | 707/5 |
| 6,587,888 B1 | 7/2003 | Chieu et al. | 719/313 |
| 6,621,505 B1 * | 9/2003 | Beauchamp et al. | 715/764 |
| 6,625,651 B1 | 9/2003 | Swartz et al. | 709/226 |
| 6,678,882 B1 | 1/2004 | Hurley et al. | 717/121 |
| 6,721,713 B1 | 4/2004 | Guheen et al. | 705/1 |
| 6,732,353 B1 | 5/2004 | Bloom et al. | 717/103 |
| 6,754,643 B1 | 6/2004 | Goldsmith | 706/14 |
| 6,754,885 B1 | 6/2004 | Dardinski et al. | 717/113 |
| 6,769,113 B1 | 7/2004 | Bloom et al. | 717/103 |

(Continued)

FOREIGN PATENT DOCUMENTS

WO WO 01/02973 1/2001

(Continued)

OTHER PUBLICATIONS

EP Patent Application Search Report No. 04 005 850.5 filed May 7, 2005.

(Continued)

*Primary Examiner*—Chuck O Kendall
(74) *Attorney, Agent, or Firm*—Kirk A. Cesari; Westman, Champlin & Kelly, P.A.

(57) ABSTRACT

A business software framework includes an application framework that has a process model. The process model provides desired services to the business components. The process model arranges operations into activities. The process model can also use an agent/service arrangement.

14 Claims, 25 Drawing Sheets

U.S. PATENT DOCUMENTS

| | | | |
|---|---|---|---|
| 6,775,485 B1 | 8/2004 | Maurer et al. | 399/9 |
| 6,782,374 B2 | 8/2004 | Nichols | 706/45 |
| 6,850,893 B2 | 2/2005 | Lipkin et al. | 705/8 |
| 6,851,107 B1 | 2/2005 | Coad | 717/108 |
| 6,877,153 B2 | 4/2005 | Konnersman | 717/100 |
| 6,889,227 B1 | 5/2005 | Hamilton | 707/102 |
| 6,912,710 B2 | 6/2005 | Broussard et al. | 717/170 |
| 6,954,220 B1 | 10/2005 | Bowman-Amuah | 715/741 |
| 6,957,193 B2 | 10/2005 | Stefik et al. | 705/51 |
| 6,973,655 B2 | 12/2005 | Jacquin et al. | 719/310 |
| 6,976,243 B2 | 12/2005 | Charisius et al. | 717/108 |
| 6,976,270 B2 | 12/2005 | Sanchez, II | 726/14 |
| 6,983,446 B2 | 1/2006 | Charisius et al. | 717/113 |
| 6,986,046 B1 | 1/2006 | Tuvell et al. | 713/171 |
| 7,051,316 B2 | 5/2006 | Charisius et al. | 717/103 |
| 7,055,130 B2 | 5/2006 | Charisius et al. | 717/108 |
| 7,139,999 B2 | 11/2006 | Bowman-Amuah | 717/101 |
| 7,149,510 B2 | 12/2006 | Hansson et al. | 455/418 |
| 7,149,699 B2 * | 12/2006 | Barnard et al. | 705/7 |
| 2004/0133445 A1 * | 7/2004 | Rajan et al. | 705/1 |

FOREIGN PATENT DOCUMENTS

| | | |
|---|---|---|
| WO | WO 01/75747 | 10/2001 |
| WO | WO 02/102093 | 12/2002 |

OTHER PUBLICATIONS

Developing a WFT Workflow System, Template Software, Inc. 1998 Whole Manual.

Using the WDT Development Environment, Template Software, Inc. 1998 Whole Manual.

Workflow Template Training Course Version 8.0, Template Software 1997 pp. 1-19.

Using SNAP Communication Component, Template Software, Inc. 1998, Portions of Chapters 1-4.

Design Patterns Elements of Reusable Object-Oriented Software, Erich Gamma et al. 1994, pp. 1-135.

Object-Oriented Modeling and Design, James Rumbaugh et al., 1991, pp. 296-362.

Object-Oriented Analysis and Design with Applications, Grady Booch, 1994, pp. 3-475.

Principles of Object-Oriented Analysis and Design, James Martin, Whole book, 1992.

Aims: Robustness Through Sensible Inspection, pp. 153-156, Sep. 2002.

Dynamic Coordination Architecture Through the Use of Reflection, ACM, 2001, pp. 134-140.

Exploiting Reflection in Mobile Computing Middleware, Licia Capra et al., pp. 34-44, Oct. 2002.

A Computational Framework for Dialectical Reasoning, Pierre St. Vincent et al., ACM, 1995, pp. 137-145.

Template Software, SNAP Class Library Reference (Referred to as CLASS), Version 8.0, 1997, pp. 3-502 to 3-512.

Non-Intrusive Object Introspection in C++ Architecture and Application, Tyng-Ruey Chaung et al., IEEE, 1998, pp. 312-321.

Object-Oriented Modeling and Design, James Rumbaugh et al., 1991, pp. 69-70, 323.

Microsoft Press Dictionary Third Edition, published Sep. 19, 1991, p. 305.

EP Search Report for Application No. 04 005 191.4-1243.

Benson B.H. et al., "The AT&T Rhapsody Business Orchestration Solution" AT&T Technology, American Telephone & Telegraph Co. Short Hills, NJ, US, vol. 5, No. 3, Jan. 1990 pp. 2-9.

Narc Thomas Schmidt, "Building Workflow Business Objects" Internet Citation, Oct. 12, 1998, pp. 1-10 http://jeffsutherland.org/oopsla98/mts.

Reflection, Self-Awareness and Self Healing in OpenORB, Gorden S. Blair et al., ACM, 2002, pp. 9-14.

Creating a Knowledge Management Architecture for Business Processing Change, Jurgen Vanhoenacker et al., ACM, 1999 pp. 231-241.

EP Exam Report App. 04 005 191.4-1243 Sep. 3, 2007.

BizTalk Server 2000, Jan. 1, 2002, pp. 124-127, 182, 205, 218, 229-230, 276-283.

European Patent Application No. 04 005 850.5 Decision to Refuse dated Dec. 2, 2008.

* cited by examiner

| COMPANY_ID 652 | ORDER_ID 654 | ORDERLINE_ID 656 | SERIAL NO. 658 | OTHER COLUMNS |
|---|---|---|---|---|
|  |  |  |  |  |
|  |  |  |  |  |
| ... | ... | ... | ... | ... |
|  |  |  |  |  |

FIG. 15

SOFTWARE BUSINESS PROCESS MODEL

BACKGROUND OF THE INVENTION

The present invention relates to business software solutions. More specifically, the present invention relates to a business process model that supports authoring and running business software applications.

Integrated business solutions typically include multiple functional products that support business segments and interact with enterprise hub and spoke networks. Such products include software applications that run financial information, human resource management, customer relationship management, professional services automation, distribution, supply chain management, and more.

In the past, achieving such integrated business solutions has been very difficult. Prior business applications have primarily focused on, and been limited to, business process automation of internal and back office functions. While this type of internal efficiency is important, it does not address relationships outside the business with individuals who are customers, suppliers, partners, financiers and employees.

To date, only the largest organizations have extended business process automation outside of their enterprise to these constituents. The cost and complexity of implementing these solutions has simply been prohibitive, particularly for the small and medium sized organizations.

One reason that the cost is so high is that one approach to designing and marketing computer software-related products is to focus on horizontal functionality such that the product is broadly applicable across large industry segments, and across many different countries. Such a system may also desirably promote an after market to meet the unique needs of specific vertical target markets and specific companies. Similarly, the product may desirably promote a customer's ability to change or customize the product to their individual needs. Such needs may be, for example, the requirement that different business products operate in an integrated fashion, even though they are from different vendors. This often requires the applications to be modified or customized so that they are compatible with one another.

If the product cannot be extended to meet the unique needs of a customer, it essentially requires a customer to change its business to match the software which the customer has just purchased. Of course, these types of systems are resisted by customers, since changes to business activities can be costly and time consuming.

There are a number of different techniques which have been conventionally used in order to enable a system to be customized. Such conventional techniques include, for example, source code modification. This technique entails providing customers with copies of the source code for the product. It thus allows a well trained practitioner to change significant amounts of content, and those changes can be made to look as if they are part of the product, because in effect, they are part of the modified source code product.

However, source code modification carries with it significant drawbacks. For example, source code modification costs a significant amount of money prior to using the product, because the user or customer must often hire expensive consultants and developers who have been specifically trained in the nuances of how the product is built. The user must then endure the risk of estimating a problem, which is a very difficult and imprecise task. Even if these problems can be overcome and persevered, the result is modified source code. When the manufacturer of the original source code ships additional software, such as bug fixes, updates, and new versions, the customer is either forced to again hire talented engineers or developers (and hopefully the same ones who made the original modifications) in order to merge those modifications into the new source code shipped by the manufacturer, and to resolve issues, one-by-one, as they arise in the newly modified source code. Alternatively, the user can simply go without the bug fixes and new features that may benefit the user's business.

In addition, source code modification makes it extremely difficult to simply purchase add-on modules "off the shelf" from multiple different vendors, because each of those vendors will likely have to modify the source code as well to accommodate their specific off the shelf modules. Consequently, not only must the manufacturer ship the source code of the base product, but each add-on vendor must ship their source as well. The user must then conduct some sort of adhoc merge process or synthesize a single product out of these random sets of source code. Of course, this results in a brittle set of code that is virtually guaranteed to have problems with upgrades or when any one of the vendors ships a bug fix.

Source code modification also suffers from the problem that only one organization in the world (the specific developers or engineers who modified the source code) knows how the modified source code product was built. Therefore, it is difficult, if not impossible, to achieve economies of scale and product support for any of the products running at the customer site.

The problems with source code modification increase significantly when, even within a single customer, there exists a diverse set of users with a diverse set of needs and preferences. Every time one of those users changes the product through the source code modification strategy in order to accommodate their particular needs, the customer employing those users, in effect, ends up with a new source code base. In other words, the customer does not only have a single custom code base, but it may actually have many custom code bases, depending upon how many specific users or departments within the customer have modified the code base. Again, each time a bug fix is published or a change is made to a customization that applies to all users, the customer must go through some sort of merge process with all other copies of the source which have been made.

This is only a partial list of the many problems associated with source code modification techniques. These problems can result in a great deal of difficulty for the management of the customer, and the employees themselves, in attempting to obtain an integrated business solution.

SUMMARY OF THE INVENTION

A business software framework includes an application framework that has a process model. The process model provides desired services to the business components. The process model arranges operations into activities. The process model can also use an agent/service arrangement.

BRIEF DESCRIPTION OF THE DRAWINGS

FIGS. 14-17 illustrate a containment hierarchy for entities.

DETAILED DESCRIPTION OF ILLUSTRATIVE EMBODIMENTS

The present invention involves a framework for supporting business applications. However, prior to describing the present invention in greater detail, one exemplary computing environment in which the present invention can exist is described.

Computing Environment Overview

Figure 1:
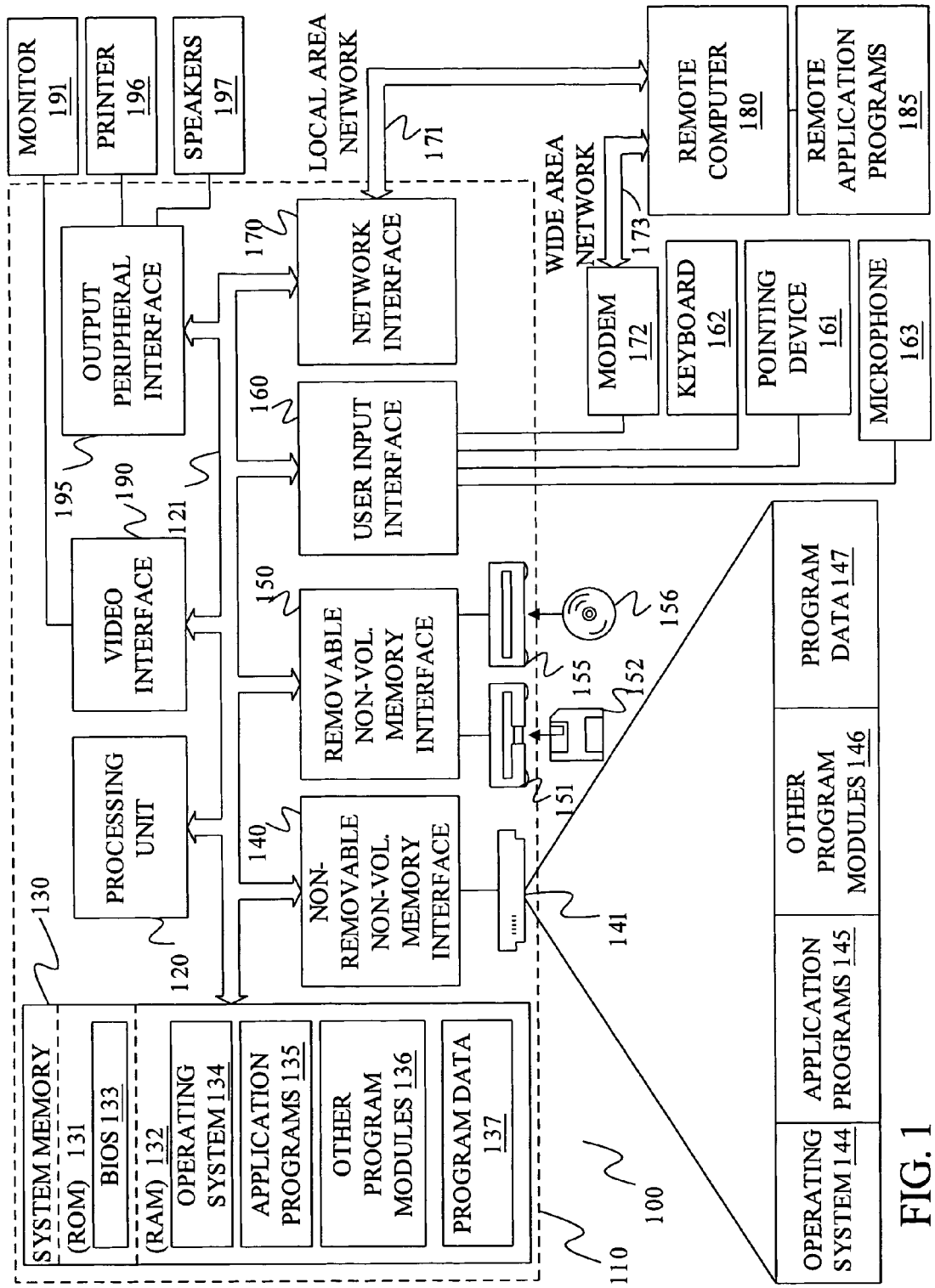
FIG. 1 is a block diagram illustrating an environment in which the present invention may be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

High Level Software Environment Overview

Figure 2:
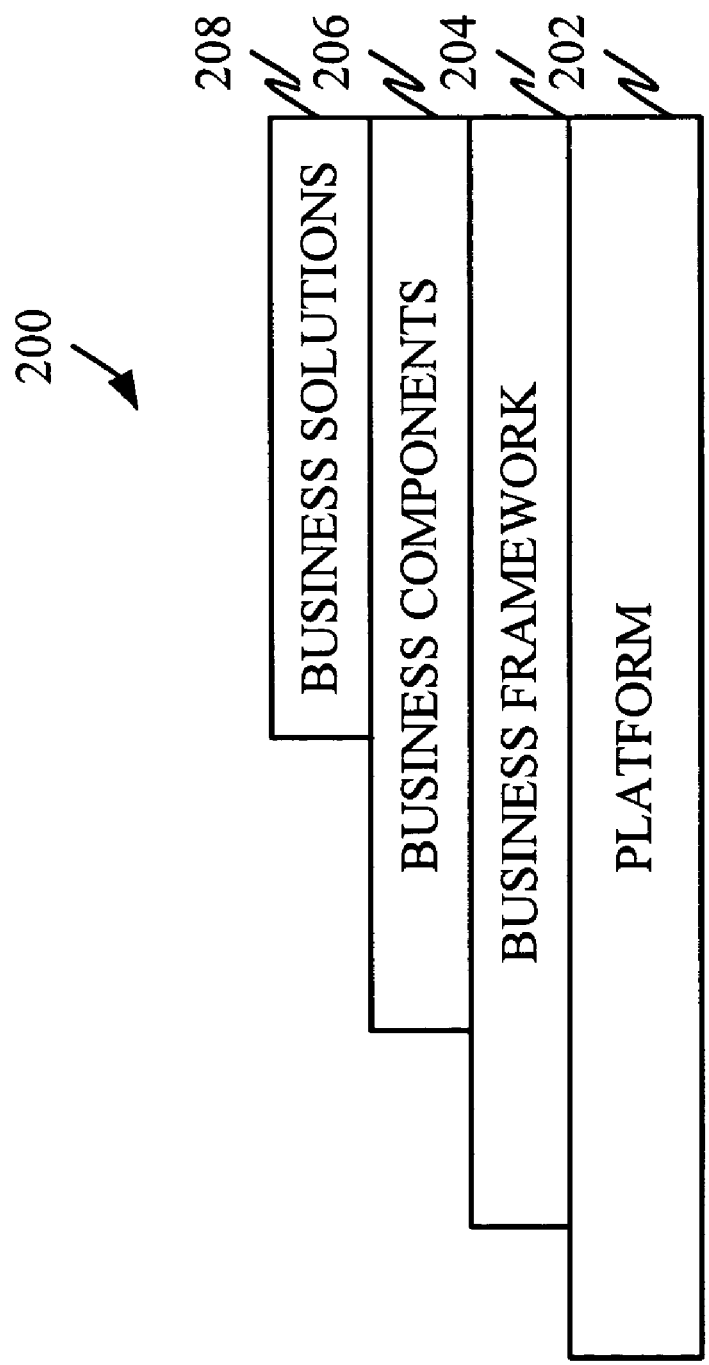
FIG. 2 is a block diagram illustrating a software environment in which the present invention can be used.

FIG. 2 is a block diagram of a higher level environment in which the present invention may reside. Environment 200 shows a tools and server platform 202, a business framework 204 in which the present invention resides, business components 206 and a business solution 208. Tools and server platform 202 illustratively provides a platform for services which allow applications to communicate and share data over a wide area network. The platform 202 can, for example, include tools and server systems to enable this functionality. Business components 206 illustratively include the functionality for business applications which are packaged together based on a developers interaction with business framework 204. Business components 206, for example, can range from general ledger and financial applications to sales force automation services and customer relation management applications. By writing business components 206 using framework 204, these components are extensible and can be utilized to serve the needs of multiple users, depending on what level of functionality and complexity is desired.

Each business solution 208 includes one or more applications. The applications are groups of business components presented through a user interface and individually deployed.

Business framework 204 is used by developers of business components 206. The business framework enables business applications in a productive, reliable and consistent fashion.

Business Framework Overview

Figure 3:
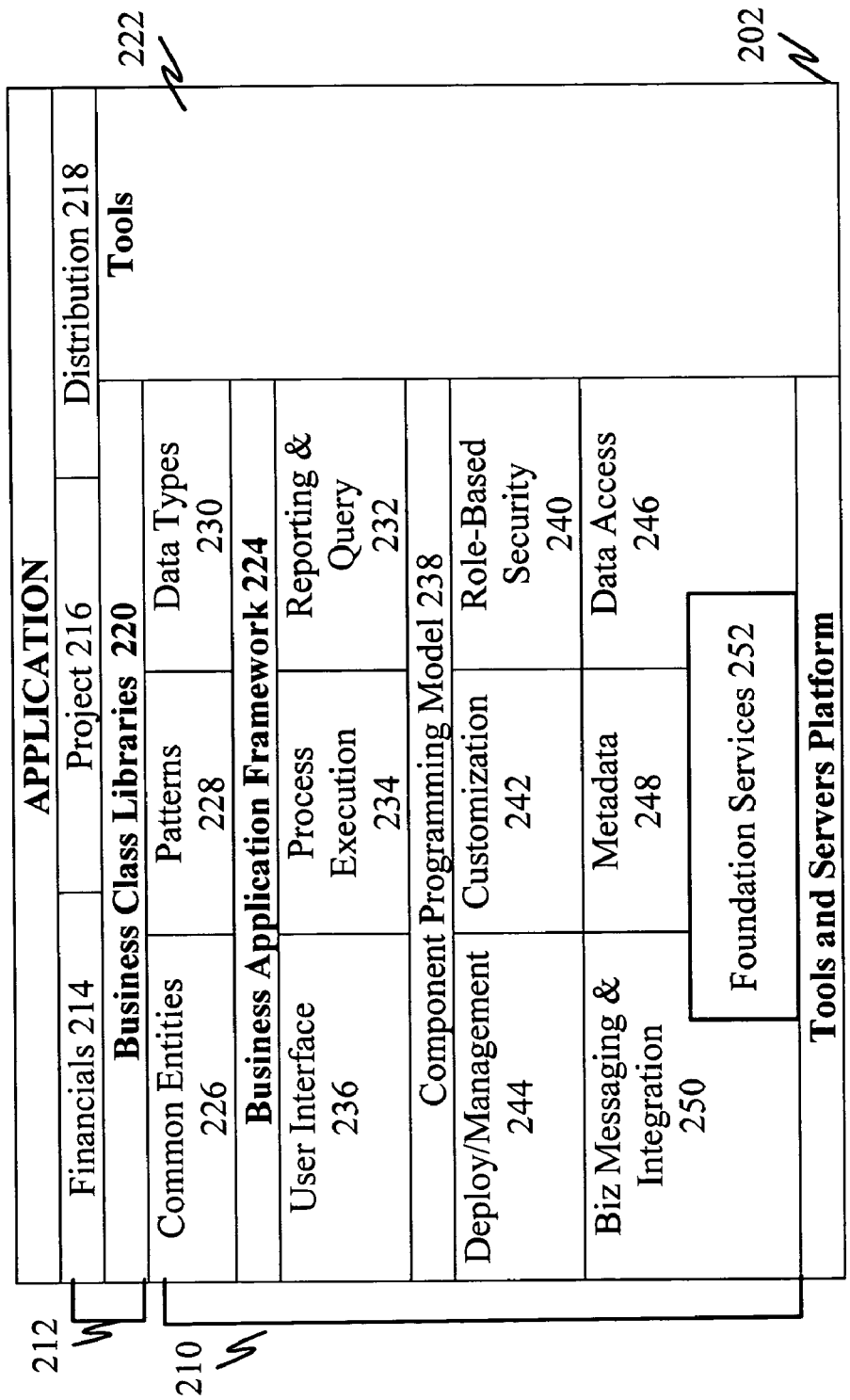
FIG. 3 is a block diagram of a business framework in accordance in one embodiment of the present invention.

FIG. 3 illustrates a number of the principle subsystems of business framework 204. FIG. 3 illustrates framework 210 supporting an application layer 212 that includes a plurality of business components 214, 216 and 218. The business components include a financial application, a project application, and a distribution application. Framework 210 is also illustrated residing on platform 202.

Framework 210, itself, includes a set of business class libraries 220, a tools subsystem 222 and a business application framework 224. Tools subsystem 222 illustratively include a plurality of design subsystems for designing components, processes, reports and end user interfaces. Tools subsystem 222 also illustratively includes test services which can be used to test designed components as well as an application packager which is used to package the components into an application or solution.

Business class libraries 220 include common entities 226, patterns 228 and data types 230.

Two business applications often require a shared understanding of data so that integration can occur. For example, distribution, financials, and customer relations management all work with customer data. Business class libraries 220 thus provides a number of common entities 226 that contain the core properties of interest to most business applications. Applications built on framework 210 can extend these entities with scenario-specific properties and behavior, through customization (which is described below).

Table 1 is an illustrative list of some of the common entities 226 in business class libraries 220. Of course, many different or additional common entities can be defined as well.

TABLE 1

| Common Entity | Description |
| --- | --- |
| Currency and Exchange Rate | Provides the foundation for multicurrency features. |
| Customer, Vendor, Employee, etc. Constituent and Role | Common constituents tracked by the system and used by many applications. Facilities for role-based personalization and security. |
| Business Unit | Operational or financial units, including companies. |
| Organization Structure | An operational or financial hierarchy of business units. |
| Products and Items | Catalog and inventory definitions. |
| Units of Measure | Qualifiers for amounts, particularly in inventory. Includes measures for volume, quantity and size. |
| Taxes | A globalized tax engine. |

There are also a number of useful data types that can make writing business applications much more efficiently. Unlike an entity 226, a data type does not have a unique identity. Table 2 lists a number of illustrative data types which can be implemented as data types 230 in business class libraries 220.

TABLE 2

| Data Type | Description |
| --- | --- |
| Money | A decimal plus a currency. All numbers need to have a unit to describe them. For money, that unit is a currency. |
| Quantity | A decimal plus a quantity unit of measure. |
| Identifers | A set of data types for implementing identifiers, including policy for autonumbering numeric identifiers, imposing structure on identifiers (e.g. social security numbers) and so forth. |
| AmountAdjuster | A utility for adjusting an amount by a numeric value or percent. This is a common idiom in many products. |

Common entities only make up a small fraction of the entities in a business application. While the common entities 226 can avoid specifying rules and processes because they vary by application, many of those rules follow frequently seen business application patterns. Business class libraries 220 provides support for writing a number of common categories of entities, processes and policies by capturing the structure and behavior of common patterns in a class library 220 as patterns 228. Table 3 is one list of a number of exemplary patterns used as patterns 228 in class libraries 220.

TABLE 3

| Pattern | Description |
| --- | --- |
| Account, Ledger, Transaction | An account is a definition of something for which activity is tracked. A ledger tracks activity for an account. A transaction is a record of activity for an account and updates a ledger. |
| Order | Work orders, sales orders, delivery orders, manufacturing order and more all follow a similar structure and business process flow. |
| Apply | An apply process associates or matches things such as documents. Examples include when a payment is matched to an invoice or when a receipt of goods is matched to its source purchase order. |

TABLE 3-continued

| Pattern | Description |
| --- | --- |
| Schedules (Calendars) | Many schedules (sometimes called calendars) are used in business applications, including for delivery, payment, manufacturing and employee work hours. |
| Structures | There are a lot of graphs and trees in business and this category of patterns provides support for implementing them. Example structures include a budget roll-up hierarchy, bill of materials and inventory stock hierarchy. |

Business application framework 224 provides a programming model and services for writing applications. In one embodiment, it contains no business logic particular to any product and thus is suitable not only for authoring business applications but also any other application fitting its profile. It provides a set of application services that provide a wide range of support. The application services are implemented in subsystems including reporting and query subsystem 232, process extraction subsystem 234, user interface subsystem 236, component programming model subsystem 238, role-based securities subsystem 240, customization subsystem 242, deployment and management subsystem 244, data access subsystem 246, metadata subsystem 248, business messaging and integration subsystem 250 and foundation services subsystem 252.

Programming Model Subsystem 238 and Process Execution Subsystem 234

As mentioned above, a logical view of an application built on business framework 204 is a set of classes representing its data, processes and rules. During design, these are further refined and grouped into business components 206. The design is structured according to a number of elements of programming model 238. The components are made up of three primary kinds of types: Business Entities, Activities and Processes written in terms of them. The components may also, of course, contain other supporting classes such as enumerations and other data types such as value types which is a specific embodiment of a type. The group of loosely coupled components that form a business application is the fundamental building block of the architecture. Components act in various roles, such as user interface management in subsystem 234, data persistence through subsystem 232 and 246 and business process execution through subsystem 234.

When implemented using application framework 224, the business components 206 are self-describing through detailed component metadata. The metadata is stored in metadata subsystem 248 or with the executable portion of the component. This information is used by application framework 224 to provide services to the business components 206 and to consumers of those components. The framework 204 provides the behavior for the metadata and can add to that behavior without changing the components. Of course, this would not be possible if the functionality were hard coded.

A business entity, as described above, manages data. A component illustratively has one primary entity, which is the focus of the component. Other entities in the component may illustratively be children of the primary entity, though they are not required to be. The data for entities is usually stored in database tables in a relational database. Accessing the data is discussed below with respect to subsystem 232 and 246.

A business process is an extensible sequence of business logic steps that usually transform data in some way. They also manage database transactions. A business process can be executed in code, through a work flow or using other means. Examples of business processes include posting, document approvals and price calculation. A business policy is a replaceable set of business rules, and a business rule is a constraint on data (such as the values a property can have or relationships an entity must have with other entities) or an inference (where, for example, if some predicate is true then an action should occur). Rules are part of entities, processes and policies and in fact business logic can be described as a set of business rules.

The interface to a component is the public members of the classes in that component. Part of a component's interface is published if it is accessible through public calls. Any published methods will, illustratively, guarantee to implement secure authorization and authentication.

When application programmers begin building an application, they must first determine the logical units of work needed. Second, they illustratively determine how each of the logical units of work will be orchestrated and finally they determine whether customization is allowed.

The business process model supported by programming component 238 for process execution subsystem 234 breaks work to be performed into three areas: Business Processes, Business Activities and Business Operations. A business operation is the smallest unit of functionality that executes in a single physical transaction. It is illustratively ACID (atomic, consistent, isolated, durable), such as a normal relational database transaction. An operation can call other operations and the collective set can share the same physical transaction.

A business activity is a code-driven process that includes some set of business operations that would collectively run in one physical transaction if possible. However, it may not be practical for them to run in a single transaction because concurrency (concurrent operations by multiple users) may suffer or the transaction may time-out. For example, posting a sales order, which logically can be completed in one transaction and thus could be represented by a single business operation may be grouped into activities instead. This is because posting orders locks data in the database so others, who wish to access the same pieces of data, must wait until the lock is released. These locks are held for the duration of a physical transaction, preventing users from accessing the data until the transaction is completed. Thus holding locks while a full order posts reduces throughput of the system and breaking the order into several smaller operations increases system throughput. Similarly, performing a large group of such operations may take longer than a normal time-out period for a transaction. Thus, if an order with thousands of line items was grouped into a single operation, a time-out would likely occur before the operation finished. Therefore, a number of operations (posting operations in this case) can be scoped by an activity. For instance, the posting operation for an order can be subdivided into several operations scoped by a single activity, which will likely not time-out and which will result in increased currency and throughput of the system.

A business process is a data driven process described using metadata and executed by a run-time engine. Therefore, a developer builds the operations which are typically written in imperative code (such as C#). These operations are grouped and scoped by activities, and the business process calls the activities to perform the overall process or work desired.

A process taxonomy is the hierarchical breakdown of units of work for an application developer. Long running (or asynchronous) and short running (or synchronous) transactions and the reuse of these components determine whether a business operation, business activity, or business process should be used. Table 4 illustrates some common categories as they apply to each of the units of work.

TABLE 4

| | Process | Activity | Operation |
|---|---|---|---|
| Stop points: ability to suspend, resume, and abort the component. | Yes | Normally no, but it is possible, e.g. - UI Interaction | No |
| Implementation: metadata or native code to enforce imperative logic. | Metadata | Imperative code (such as C#) | Imperative code (such as C#) |
| Transaction: Failures: Expected behavior or handlers for the component | Long Forward arc Based on Exceptions | Long Checkpoint/ | Short (ACID) Rollback and None |
| Isolation: expected async or sync behavior. | None | App Locks | DB Locks |
| Composes: only allowable children components. | Process, Activity, Operation | Operation, Activity | Operation |
| Invocation: method that is used to start the component | Execute( ) | Execute( ) | Not directly callable |
| Customization | Add, remove, re-order activities, process events (on completion, suspend, resume, and abort) | Pre/Post Execute( ) events, Policy, and activity or operation Replacement | Pre/Post Execute( ) events, Policy |

Table 4 illustrates that stop points are available for processes and activities. This means that the process or activity can have points where they stop in the middle thereof, for further interaction from an external system, such as a user or other system. Operations, however, since they are the smallest unit of work performed, are performed all at once and are not susceptible to stop points.

The table also shows that processes are defined by metadata while activities and operations are defined by imperative code.

The table also indicates that a process and activity are long transactions while an operation is a short (ACID) transaction. A long running transaction is made up of several physical (short running) transactions. Thus, the isolation (from other users) characteristic of an ACID transaction is lost, but the other characteristics are still desired. It also involves a different approach to dealing with failure in the middle of the process, since complete rollback of the transaction is not possible in most cases.

Next, the table indicates what happens when a failure occurs during the unit of work. In a process, exceptions or forward arching techniques can be used. Check pointing can be used in an activity. A check point allows the activity to be restarted from the most recently recorded checkpoint, if a subsequent failure occurs. For example, if part of a batch of orders is posted in an activity, a checkpoint will be set after each posting operation is complete. Therefore, if a subsequent posting operation fails, the activity need not be started from the beginning, but only from the last saved checkpoint.

The table next indicates whether the unit of work is isolated from work performed by other users. The table indicates that during an operation, the database locks the data involved so that others cannot access it. During an activity, the application marks ("locks") the data involved as "in use". In this instance, the application will typically set an indication that certain data is being modified so that other processes or activities can view the data, but they will also have an indication that it is currently being changed or accessed and thus will not, by convention, modify the data. This is a convention respected by the application for the benefit of the user and not a physical lock. The table also shows that processes do nothing to isolate other parts of the system from their actions.

The table next indicates which other units of work a given unit of work can call. A process can call another process, another activity, and possibly an operation. An activity can call another activity or an operation and an operation can only call another operation.

The table next indicates how each unit of work can be invoked. The process and activities are invoked by calling an Execute method, for example, while the operation is not directly callable by an external component, but is only callable by an activity or another operation (and possibly a process).

The table next indicates how the units of work are customized. The process can be customized by adding, removing, or reordering activities. It can also be customized by how events are processed (such as on completion, suspension, resumption, or abortion of operations or activities). An activity can be customized based on events posted prior to or after the Execute method is called or completed, based on policy, or the activities can be replaced. An operation can be customized by subscribing to a pre or post Execute event, or by implementing policy.

Figure 4:
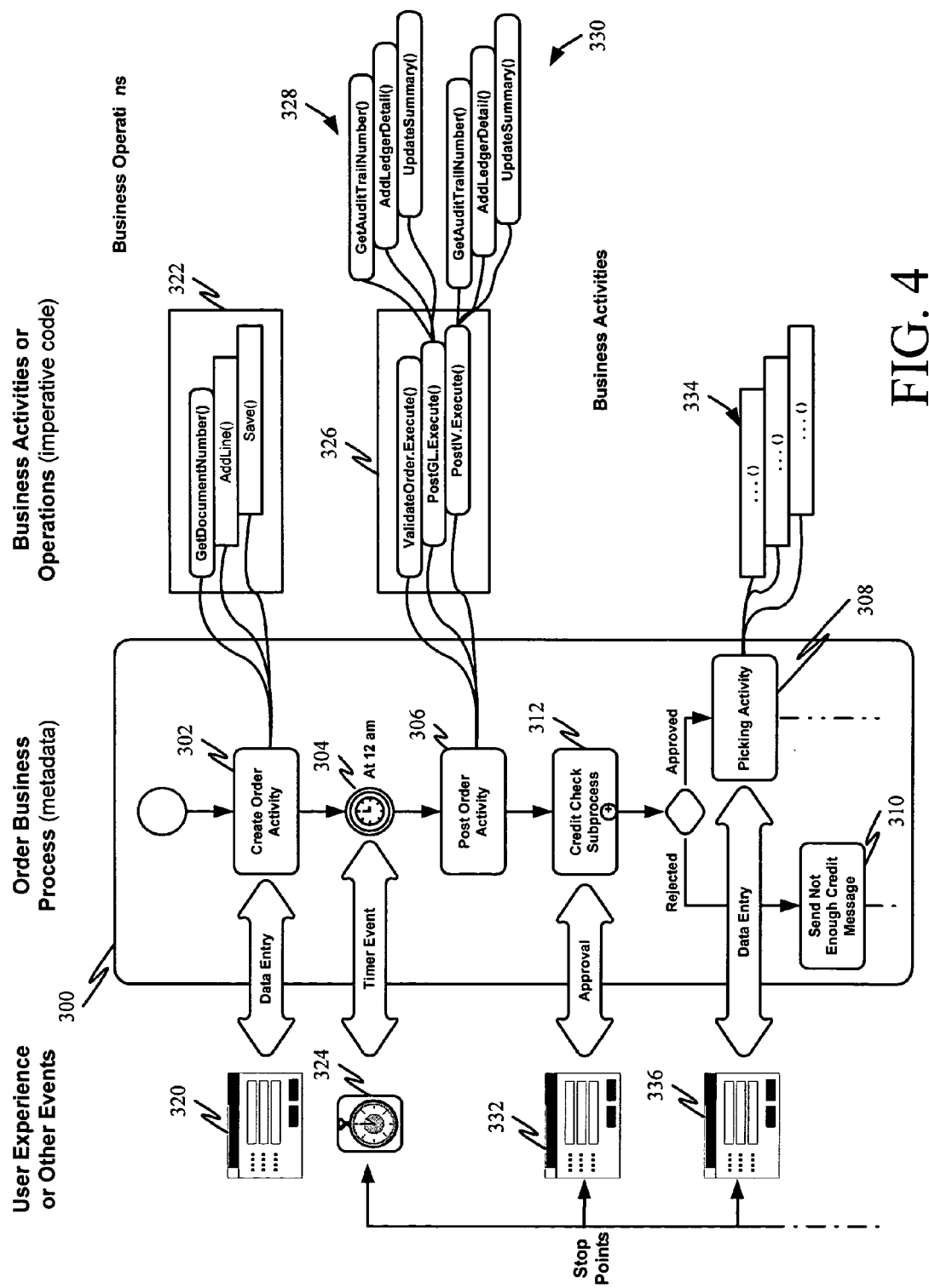
FIG. 4 is a block diagram illustrating a business process.

FIG. 4 illustrates the arrangement of a process for creating an order, posting it at a specific time, and then performing a credit check. FIG. 4 illustrates that, using the process taxonomy, a developer can physically and logically define transactions and the process around it.

The overall process in FIG. 4 is indicated by block 300. Activities that form the process are shown within block 300. Those activities include Create Order 302, Time-Out 304, Post Order 306, Picking activity 308 and Message activity 310. Process 300 also shows that another process (Credit Check process 312) can be called by process 300.

In an illustrative embodiment, process 300 is authored by the author using a process description language (which can be metadata, a text language, etc.) which is interpreted by a work flow run time engine. An advantage to authoring in the process description language is that, even if changes are made, the description need not be recompiled before running the process again. However, if the process were authored in a programming language such as C#, then in order to make a change to the process, the code must be recompiled each time a change or customization is made. Perhaps more importantly, if the process description language is structured properly, upgrade customizations can be made without user intervention. Of course, each of the individual activities or operations can illustratively be authored in the programming language.

In order for the process to begin executing, a user or another system event causes the process to move forward. In the example illustrated in FIG. 4, a user creates a new order, such as by performing data entry through a screen 320. This initiates the Create Order activity 302. The Create Order activity is composed, in the illustrated embodiment, of a plurality of business operations 322.

The post order activity 302 is itself composed of a number of operations 322. The operations illustrated in FIG. 4 include obtaining a document number, adding a line to the document and re-saving the document. When this is complete, activity 302 calls the Time-out activity 304 which references a timer 324. Time-out 302 waits for a time-out event from timer 304 and then calls the Post Order activity 306.

FIG. 4 illustrates that Post Order activity 306 is formed of a plurality of additional activities 326, each of which are called by Post Order activity 306. The activities 326 include validating the order, posting the order to the general ledger and posting the order to inventory. Each of these activities 326 is made up of a plurality of operations. Exemplary operations for the activities of posting the order to the general ledger and posting it to inventory are illustrated by reference numerals 328 and 330. It should be noted that operations or activities can be called to any depth in order to achieve a desired work. It should also be noted, using check pointing, if Post Order activity 306 fails at any point, it need not restart itself from the beginning, but may restart itself from the most recently saved check point.

Once Post Order activity 306 is complete, it calls Credit Check subprocess 312. Credit Check subprocess 312 is referred to as a subprocess because it is called from within process 300. FIG. 4 illustrates that subprocess 312 also includes a stop point in that it waits for a user to manually approve the credit. This can be done, in one embodiment, by entering data through a screen 332.

Based on the outcome of subprocess 312, credit will either be approved or rejected. If it is approved, subprocess 312 calls Picking activity 308 in which the ordered products are picked for delivery. The Picking activity is shown as being formed of a number of operations 334. Picking activity 308 also includes a stop point such as waiting to receive a user indication that the products have been successfully picked, through a data entry screen 336.

If subprocess 312 determines that the Credit Check has been rejected, then it calls Message activity 310 which includes operations that send an electronic mail message to the user that initiated process 300, indicating that the Credit Check has been rejected.

While FIG. 4 illustrates that a branching point exists after the Credit Check subprocess 312, it will of course be appreciated that any number of branches can be developed in such processes. It will also be noted that the user or developer can modify or customize the processes simply by inserting or deleting activities or subprocess within process 300 by customizing the metadata (or other process description language) that describes the process. Similarly, the user or developer can customize the process by subscribing to events already in the process and handling the events with custom code or otherwise, as desired.

Figure 5:
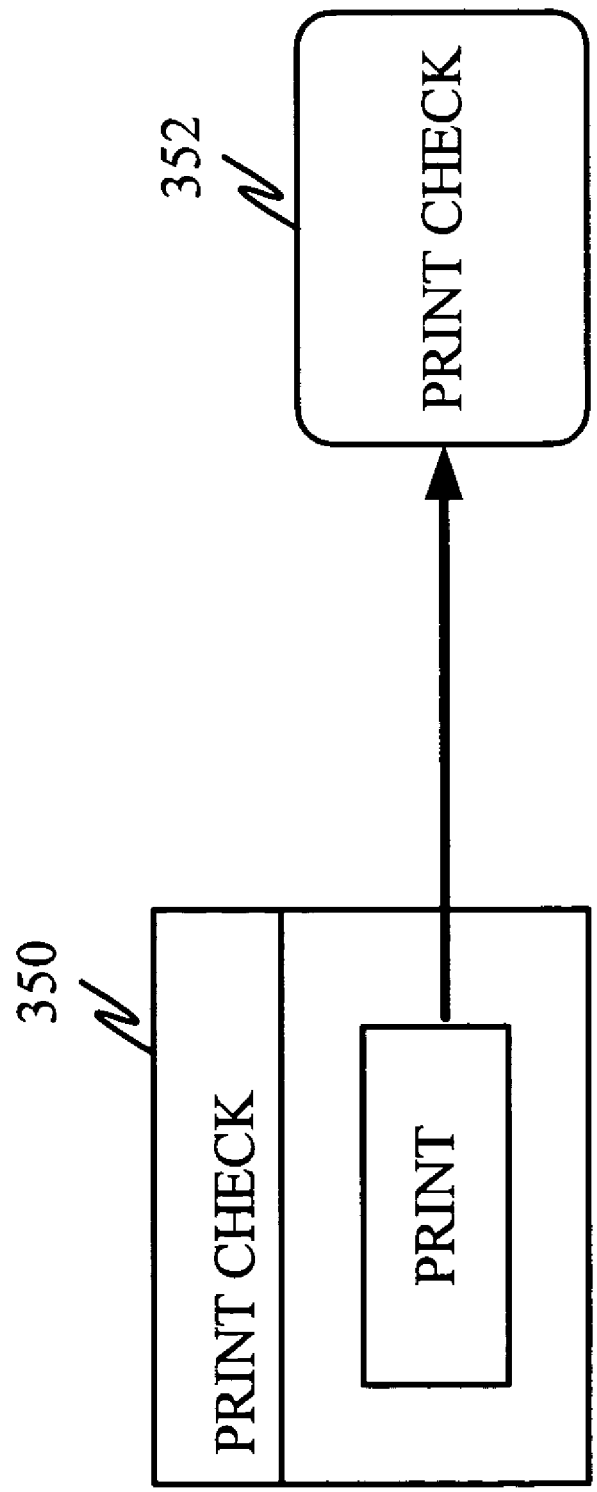
FIGS. 5-7 are block diagrams illustrating additional business processes.
Figure 6:
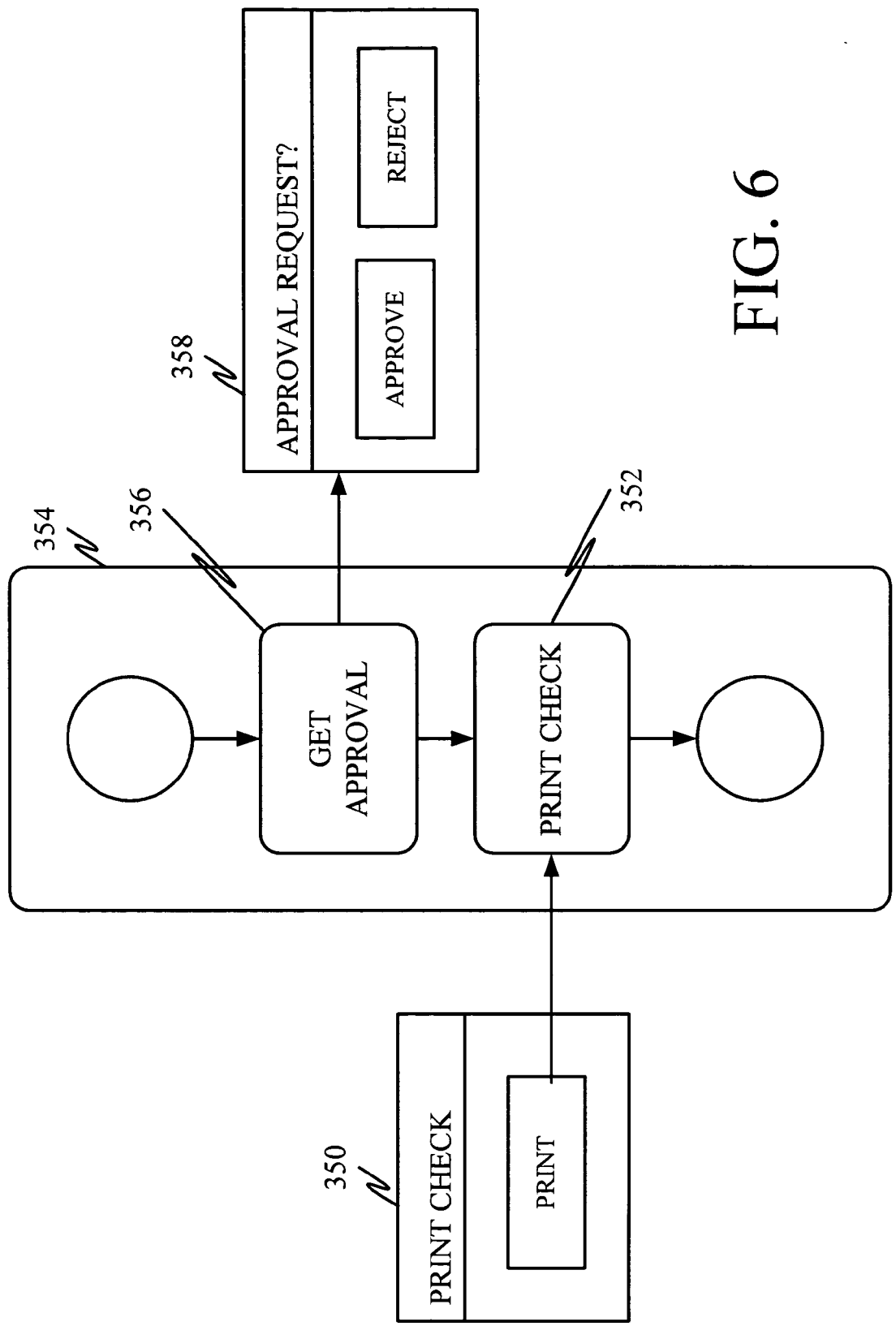
Figure 7:
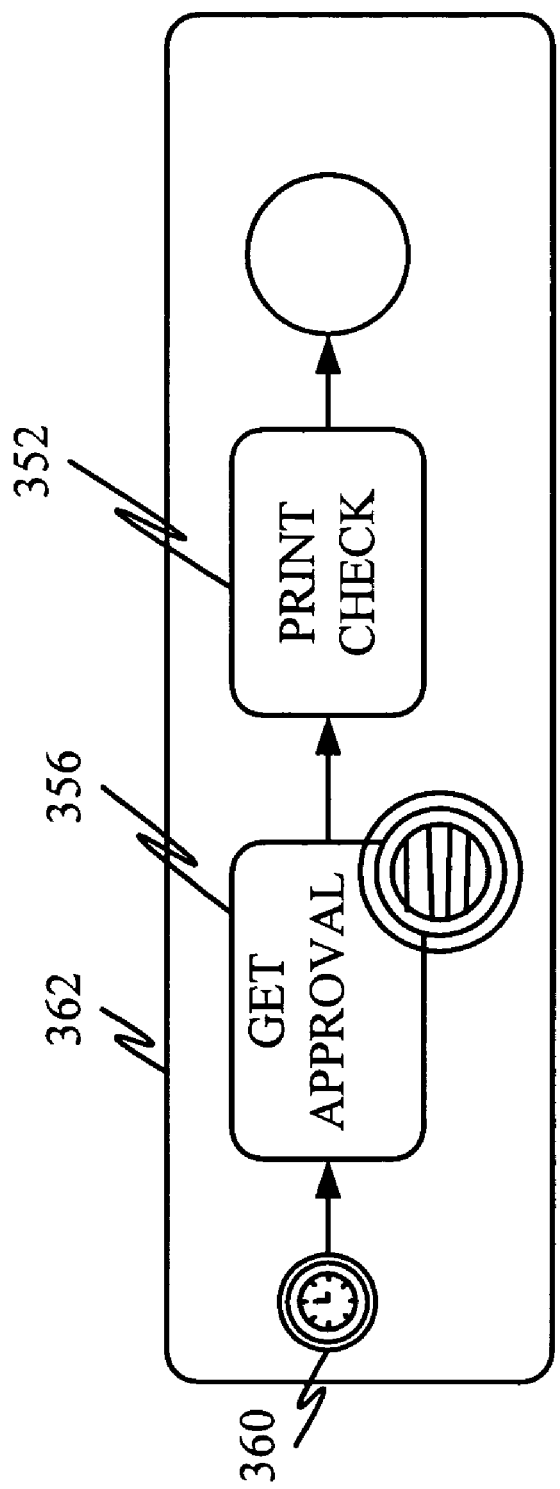

FIGS. 5-7 further illustrate the process of generating a business process. Assume first, with respect to FIG. 5, that a user interface 350 is configured to directly call a business activity such as Print Check 352. The Print Check business activity will, of course, call business operations in order to accomplish the desired work.

Now assume that, some time later, a vendor, customer, or other developer, wishes to use the same Print Check business activity 352 as part of a larger business process. Without changing any code in either the user interface 350 or the business activity 352, itself, the process description language (e.g., metadata) can be changed to specify that the Print Check business activity 352 will execute within the context of a business process 354 shown in FIG. 6. The business process is thus responsible for validating that all prerequisites for the Print Check business activity 352 have successfully completed. Assume also that an intermediate stage in the form of a Get Approval subprocess 356 is made part of the same business process 354 as the Print Check business activity 352. The Get Approval subprocess 356 also has a stop point which requires manual intervention from a user interface 358. In process 354, anyone attempting to invoke the Print Check business activity 352 through user interface 350 will fail unless the necessary prerequisites (Get Approval 356) has been completed first.

Later, assume that instead of someone manually starting the process 354 illustrated in FIG. 6, that a user wishes to customize the process such that it automatically starts at a predetermined schedule (such as the 15$^{th}$ and 30$^{th}$ day of each month). Assume further that the Get Approval subprocess 356 can be automated by using business rules such that no manual intervention is needed. A new process 362 can be created simply by amending the process description language (e.g., the metadata) to include a timer 362 which starts the now fully automatic Get Approval subprocess 356. Of course, the metadata is also adjusted so that the output of Get Approval subprocess 356 is the only prerequisite for initiating the Print Check business activity 352.

From the above FIGS. 4-7, it can be seen that the business processes described are fully customizable. Stop points can be added at substantially any point either within the process or within activities outside the process. Similarly, developers can subscribe to events generated by operations, activities, or processes, and can insert customized code in response to the events. Further, because the processes are described by a process description language, instead of in imperative code, customizations can be made without recompiling.

Figure 8:
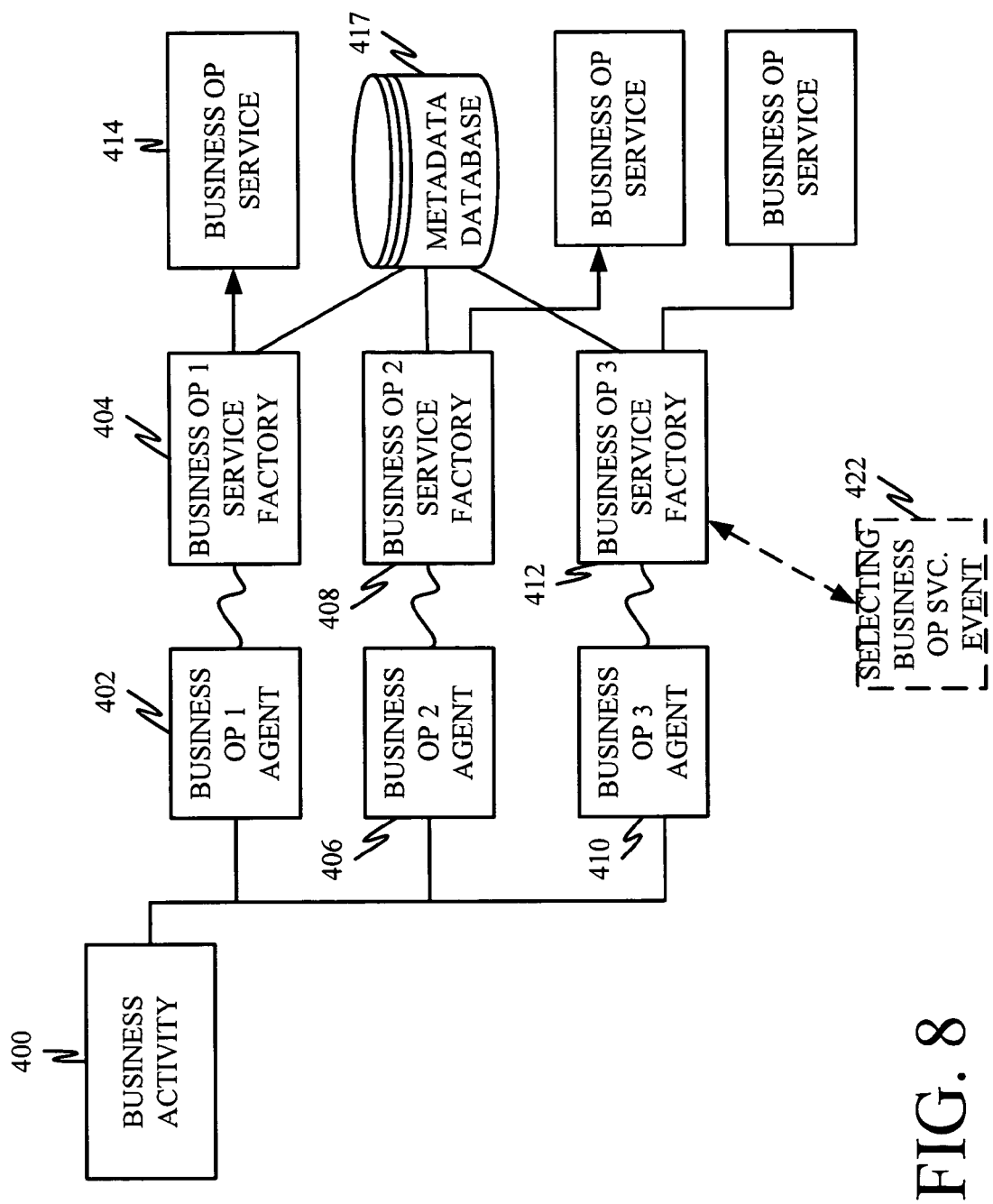
FIG. 8 is a more detailed block diagram of how a business activity can be implemented.

FIG. 8 illustrates, in greater detail, how a business activity 400 can be implemented. In one embodiment, as described above, the business activity 400 is broken into a plurality of individual transactional steps, (business operations).

Business functionality may desirably exist near to the data it manipulates and near to its user, who must view the results of the functionality being performed on the data. However, in distributed computing environments, the user and the data are often separated by high latency, networks that exhibit low to moderate reliability. For example, in one common scenario, users are clients and data resides on servers.

Business operations in accordance with one embodiment of the present invention, follow an agent-service pattern. A business operation agent is the only part of the process that a client directly interacts with. A client that needs to run the business process creates an instance of a business operation agent and sends it properties to provide its required inputs. In turn, the agent locates a corresponding service class (through a service factory), instantiates it, and calls it to actually perform the work that implements the service.

Through an agent/service pattern, the programming model avoids location transparency because location of execution can be considered when constructing a distributed application. The agent/service pattern also provides a great deal of deployment flexibility by providing a programming model abstraction that supports the client/server scenario and many others.

More specifically, FIG. 8 further illustrates that business activity 400 is implemented using three business operations, operations 1, 2, and 3. Business operation 1 has an agent 402 and a business operation service factory 404. Business operation 2 also has an agent 406 and a service factory 408. Business operation 3 also has an agent 410 and a business operation service factory 412.

Given some piece of business functionality, the agent runs as near to the user of the functionality as desired and possible, and the service runs as near to the data as desired and possible. The "nearness" may differ with each deployment scenario and each kind of user.

The entity classes and business process classes can be divided into agent and service portions (such as the agents and services illustrated in FIG. 8). The agent portion is a normal class instance and holds state, while the service portion does not hold state across calls. Where necessary, the agent calls the service to perform data manipulation and to execute business processes. The specifics of how functionality is divided between the agent and service can vary, as desired.

A developer using a business component normally deals with only the agent. The agent provides a rich object oriented programming model where data is held across calls, rather than being limited to talking to services directly with procedural calls that require data to be respecified on each call. When calling the service, the agent can use its internal state to formulate the request rather than requiring the developer to do it. This simplifies the developer experience.

The agent/service pattern thus provides a single programming model for both client and server. Agents can be used either by the client machine or by the services on the server machine. Internet latency cost is also reduced since state is moved to the client from an entity graph in one round trip (instead of one round trip per property as is traditionally the case). Similarly, the agent provides client-side behavior to avoid round trips. In addition, the agent-to-service interactions are stateless, aiding server scalability and reliability. Finally, the ability to implement several different deployment scenarios with the same components is greatly enhanced.

Customization of Processes

To customize a process, the agent itself is not replaced. The client (such as a process or activity) always creates and calls the same original business operation agent. This ensures that the client is always able to call the agent because it will have a stable interface. Business operation agents can have extension fields associated with them which can have additional properties added to them. This provides agent extensibility without breaking the original agent interface contract. The agent may locate the correct service to run in a number of different ways.

Business processes can be customized depending on whether the process is a process which is planned for replacement or whether it is a process that is going to be replaced on an adhoc basis. If it is planned for replacement, the calling application (or client) passes a service ID into the agent currently being called. The service ID indicates which service to activate. Thus, if the call passes agent 402 (shown in FIG. 8) a specific service ID, agent 402 identifies through service factory, the business operations service 414, instantiates it, and calls it to perform the operation. Simply by passing in a different service ID, the service can be changed.

For an operation which is replaced on an adhoc basis, there are two different methods that can illustratively be used in order to override the built-in selection of the business operations service. For example, if the service ID is stored in a metadata structure in store 417, the customizer can simply customize the portion of metadata which holds the service ID for the business operation to be overridden. This will be handed to the business operation's service factory being used and it will instantiate and call the newly identified business operation service. In another embodiment, the particular service factory being utilized (e.g. factory 412) propagates an event. The vendor who wishes to customize a service operation can subscribe to this event and place logic in the associated event handler 422 to alter the value of the service ID. This method not only allows customization of the business operation, but also allows dynamic selection based upon data contained in the business operation agent.

Context for Customization

In accordance with one embodiment of the present invention, software that may need to be customized includes several basic classes of content, which includes user interface content, data and process content. User interface content includes content that a user sees on a screen or report. It may contain such things as layout information, messages, field labels, etc. Data represents information that the system stores. For example, data includes customers, inventory items, orders, etc. Process content includes work flow specifications that route work through a defined set of steps, as well as lower level processing logic that executes well defined actions on a piece of data. An example of process content may include, for example, the work flow and lower level processing logic that posts an order to a ledger or reserves an inventory item. These types of content, as well as other types, can be customized in accordance with various embodiments of the present invention.

Regardless of the type of content to be customized, customizations may desirably be associated with a given context. Context governs when the customization is relevant. That is, the notion of a context allows some customization to only apply to a specific user, whereas other customizations apply to a whole set of users who belong to a specific group, and still other customizations apply to an entire company, without regard to users. These are but three different examples of context, and many others can be used as well.

Customization of Entities

Figure 9:
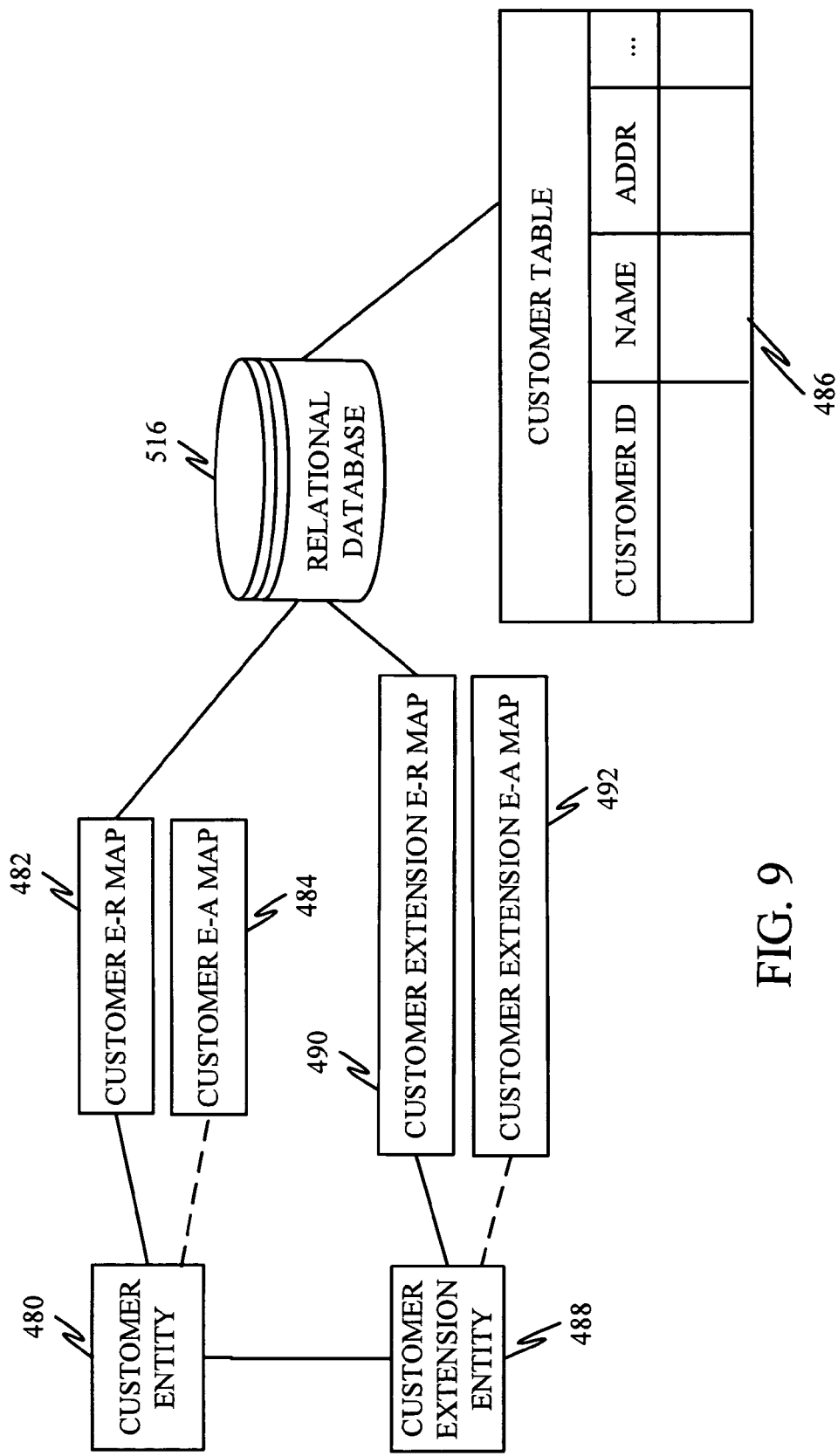
FIG. 9 illustrates one embodiment of the customization of entities.

In order to better illustrate the operation of customization subsystem 242, the discussion will now proceed with respect to FIG. 9. This Figure better illustrates customization of entities. This is also referred to herein as "entity extension".

Figure 10:
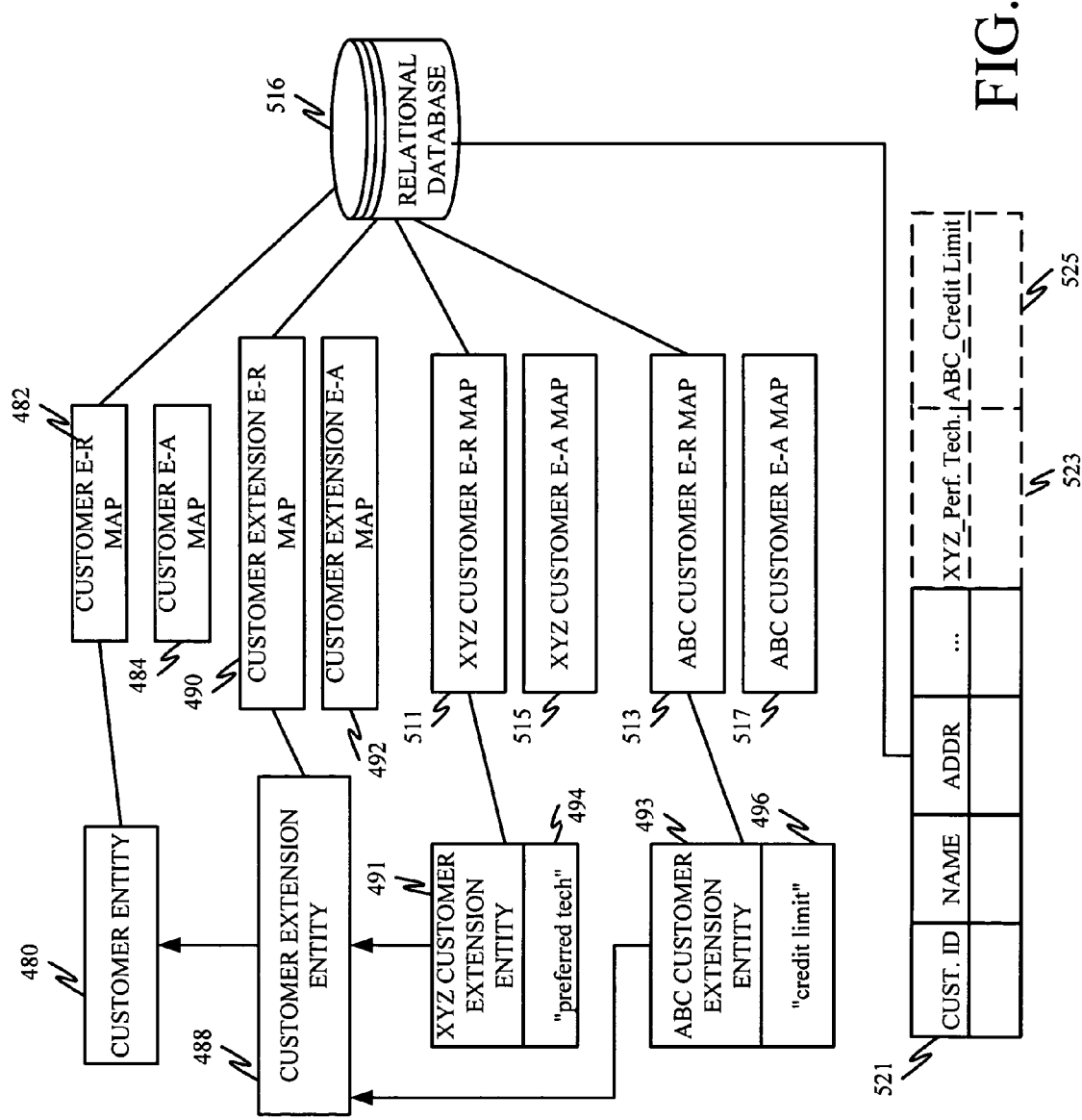
FIG. 10 illustrates extension properties added to entities.

FIG. 9 illustrates data structures that are created when an entity in a customization-enabled subsystem is created. FIG. 10 illustrates the data structures that are shown in FIG. 9, in addition to data structures that are created, or modified, when an entity is customized.

FIG. 9 shows a base entity 480 in a business application. The exemplary business entity 480 is a "customer" entity that identifies a customer in a business application. It will of course be appreciated that the specific examples illustrated are only examples and that the inventive concepts apply to other entities as well. Base entity 480 represents the entity being extended (or customized) FIG. 9 also illustrates that base entity 480 is mapped to relational database (such as 516 discussed in greater detail later with respect to FIG. 13) by the customer ER map entry 482 in the ER map. A relationship between base entity 480 and other entities is identified in customer EA (entity association) map 484. FIG. 9 further illustrates that relational database 516 illustratively includes a customer table 486 associated with customer entity 480 that includes a customer ID field, a name field, an address field, and any other fields desired for identifying a customer.

Since the present customization subsystem does not require source code modification in order to customize entities, base extension entity 488 is also provided to enable the dynamic addition of new entity relationships to the base entity without recompilation of the base entity 480. A base extension entity 488 is created for each base entity 480 that is created. Base extension entity 488 illustratively includes the name of the base entity 480 such that, in the present example, base extension entity 488 is named "CustomerExtension". Base extension entity 488 is initially empty but can include a customer extension E-R map 490 and a customer extension EA map 492 which will also be empty. Base entity 480 contains a composition field that identifies the base extension entity. For instance, base entity 480 can include a composition field named "Extension" of the type "CustomerExtension". Entity association metadata for the Customer entity 480 reflects a relationship with the CustomerExtension entity 488. Both entities 480 and 488 are illustratively shipped and deployed as DLLs when the product in accordance with the present invention is installed. At that point, a customizer can begin adding extension properties to the Customer entity 480 through a customizer user interface.

FIG. 10 illustrates how the extension properties will be added. A customizer interface includes a user interface (UI) that calls into customization subsystem 242 with a list of new properties to be added to an identified entity. The specification of the new properties to be added is passed into subsystem 242. The customizer can also identify the particular context for which the particular customization is to be applied.

This causes subsystem 242 to create a new entity which is referred to as an ExtensionEntity. Two ExtensionEntities 491 and 493 are illustrated in FIG. 10. Each ExtensionEntity 491 and 493 includes at least one Extension property 494 and 496, respectively, that identifies the customized property. FIG. 10 illustrates an embodiment in which customizations have been made by two different customizers, labeled customizer XYZ and customizer ABC. Therefore, ExtensionEntity 491 is illustratively named XYZ.CustomerExtension and ExtensionEntity 493 is illustratively named ABC.CustomerExtension.

By way of example, assume that customizer XYZ desired to customize the customer entity 480 to include an identification of a technician which was preferred by the customer identified by entity 480. In that case, XYZ.CustomerExtension entity 490 includes Extension property 494 referred to as the "preferred technician property". Similarly, assume that customizer ABC desired to customize the customer entity 480 to include a credit limit associated with the customer identified by entity 480. In that case, ABC.CustomerExtension entity 493 includes Extension property 496 which identifies a "credit limit" associated with the given customer.

Not only does subsystem 242 create the ExtensionEntities 491 and 493, with their corresponding Extension properties 494 and 496, but it also illustratively creates E-R maps 511 and 513 and E-A maps 515 and 517, respectively, corresponding to each of the ExtensionEntities 491 and 493. In addition, subsystem 242 creates a table in relational database 516 (such as through data accessing system 246 that corresponds to the ExtensionEntities 491 and 493 and the other associated data structures).

Finally, base ExtensionEntity 488 is recompiled and its E-R map is regenerated to reflect the new relationship with the ExtensionEntities 491 and 493. Similarly, E-A metadata is generated to reflect the new relationship with the ExtensionEntities as well.

FIG. 10 also illustrates that in one embodiment, the entity extensions are stored in the table illustrated as 521 in FIG. 10. It can be seen that table 521 includes the original table that stores data associated with customer entity 480. The original table is simply extended to include a plurality of additional fields 523 and 525 which correspond to the entity extensions. Thus, columns in the original columns in table are unmodified. Extensions are simply added to the original table which correspond to the entity extensions.

Metadata Subsystem 248 and Metadata Customization

Figure 11:
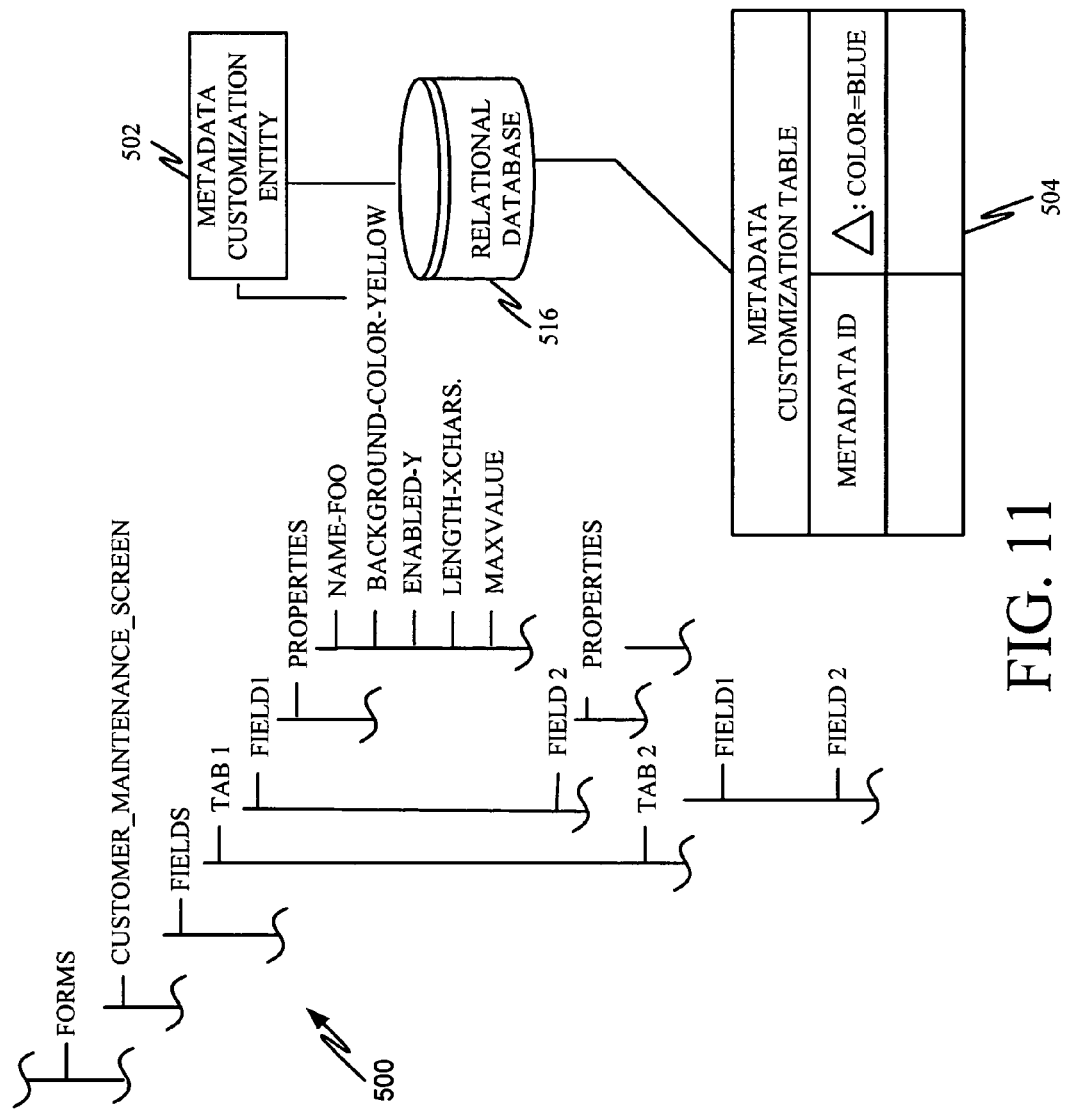
FIG. 11 illustrates a metadata structure supported by the metadata subsystem in accordance with one embodiment of the invention.
Figure 12:
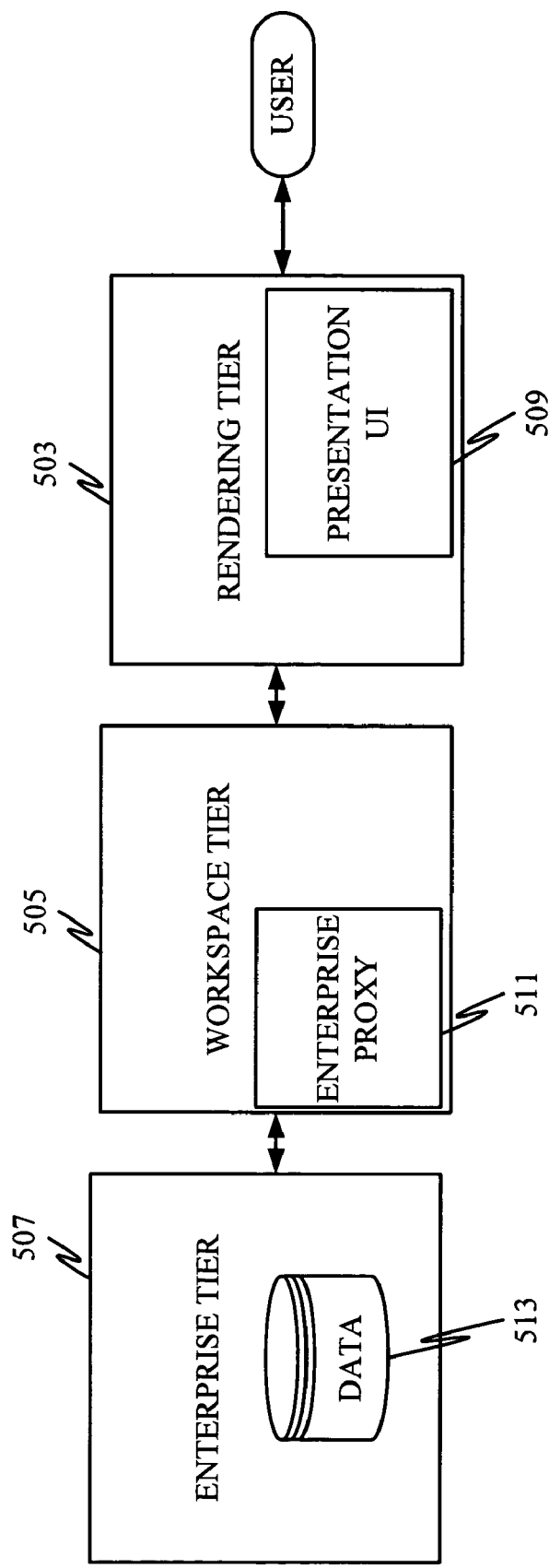
FIG. 12 illustrates logical tiers.

FIG. 11 illustrates a metadata structure supported by subsystem 248 and metadata customization referred to herein as "delta-based customization". The metadata structure in FIG. 11 is illustrated by a portion of a metadata structure tree 500. It will be appreciated that the portion of tree 500 shown in FIG. 11 is illustratively but a very small portion of a much larger tree that defines metadata for the system. The portion shown in FIG. 11 illustrates that the metadata includes a Form section which itself includes a Customer_Maintenance_ Screen. The Customer_Maintenance_Screen includes fields which have a plurality of Tab controls. Tab control 1 has a Field 1 associated with it. Field 1 has a plurality of properties, including the field name, the background color for the field, whether the field is enabled or disabled, the length of the field, and the data type for the field (which in this case is Max-Value). Of course, the field can have a plurality of additional properties as well. Metadata structure 500 is stored in a metadata store.

In order to customize a metadata structure 500, the customizer inputs the customization specification through a customizer interface to subsystem 242.

In an embodiment of the present invention, customization of all types of metadata in data structure 500 is achieved by using deltas. A delta represents a change in the metadata structure 500 from its original form. A customization can contain any number, n, of deltas, each delta representing a specific change relative to a known instance of a base target, an addition or a deletion.

As an example of changing a value, in the original data structure 500, the background color for the field having a name "foo" is yellow. Assume that a customizer wishes to change the background color to blue. In that instance, the customizer will have made a single customization containing a single delta. The customization is relative to the field "foo" under Tab 1 of the Customer_Maintenance_Screen. The customization can be stored in a separate part of the metadata store or in a metadata customization entity 502 which is mapped to the relational database 516. A table in relational database 516 that can form a part of the metadata store is illustrated by table 504 which contains a metadata ID identifying the background color property of field 1 under tab 1 of the fields in the Customer_Maintenance_Screen portion of the Forms. Table 504 also includes delta information which identifies the delta, that being that the background color of the field is changed to blue. Thus, the delta is not a copy of the source that has been modified. Instead, it is only a specification of which value in structure 500 should be modified. By only tracking deltas, it is possible for many modifications to be dynamically applied to a target without conflicting.

In order to apply the deltas, a customization-enabled subsystem calls subsystem 242 which applies customizations in the present context. For instance, assume that customization-enabled subsystem is the Form loading subsystem. Further assume that a user has requested the Customer_ Maintenance_Screen to be displayed. Of course, subsystem 242 then identifies all instances in the relational database that apply to the current context for the form named Customer_ Maintenance_Screen. The subsystem 242, for each instance identified, applies the customizations. It can be seen that the customization to be applied to the metadata requires that the background color of Field 1 under Tab 1 of the Customer_ Maintenance_Screen be changed to blue. The code in the subsystem 242 makes this change and the customized portion of structure 500 is passed back to the customization enabled form loader for use in rendering the screen.

Execution Tiers in Deployment Subsystem 244

Deployment/management subsystem 244 provides for flexible deployment capabilities. The components of an application may be at a single site, hosted on an external site, used off line, used by a single machine or at an installation of multiple servers, or any combination of these.

The execution architecture is layered into three logical tiers: Rendering tier 503, Workspace tier 505 and Enterprise tier 507. All three tiers can run on the same machine, or each may run on a separate machine. One tier may illustratively not be split between machines. This layering allows applications to be deployed in a number of configurations. While, in accordance with one embodiment, an enterprise tier 507 is required, all other tiers are optional. For example, if there is no user interface, there will be no rendering tier 503.

Three logical services support these tiers for different scenarios including presentation (or UI) 509, enterprise proxy 511 and message receiver scenarios. They are logical services in that there is no one service for all applications or scenarios.

The rendering tier 503 accepts HTML, or some other rendering format, and produces the screen display for a user on some device. On a client side only implementation, the end user of the product interacts only with this layer. The rendering tier then receives user events and either handles them, or passes them to the presentation service 509. The presentation service 509 supports the rendering tier 503 and thus is only needed when a user interface exists. It can run on the rendering tier 503, workspace tier 505 or both. The presentation service 509 maps interactions with agents into pages to be displayed to the user. This can produce HTML, or may have a different contract with the rendering engine.

The workspace tier 505 creates and submits a request to the enterprise. This is the execution environment for a consumer system or a single user. In scenarios where the workspace tier 505 is to operate offline from the enterprise tier 507, an enterprise proxy 511 provides several useful services, including a local store. The enterprise proxy 511 acts as a synchronization engine, and runs on the workspace tier 505. The enterprise proxy 511 can hold reference data obtained from the enterprise 507 for submitting correct requests, such as a product catalog for use in creating a purchase order. The workspace tier 505 thus makes requests of the enterprise proxy 511, as if it were the enterprise. The proxy 511 services the request from its local store, if possible. Similarly, pending requests to create or modify entities may also be stored. Upon reconnection to the actual enterprise tier 507, the enterprise proxy service 511 reconciles any pending requests with the enterprise 507 and refreshes any reference data.

The enterprise tier 507 holds the business logic that implements the application functionality. The enterprise tier 507 does not provide direct access to its database 513 and validates all requests. A message receiver services on the enterprise tier 507 receives requests from clients to update data. The message receiver service receives those requests and validates the data in those requests in order to protect the integrity of the data 513 in the server. In cases where the client is fully trusted, the message receiver service is not needed. This service runs on the enterprise tier 507.

Data Access Subsystem 246

Figure 13:
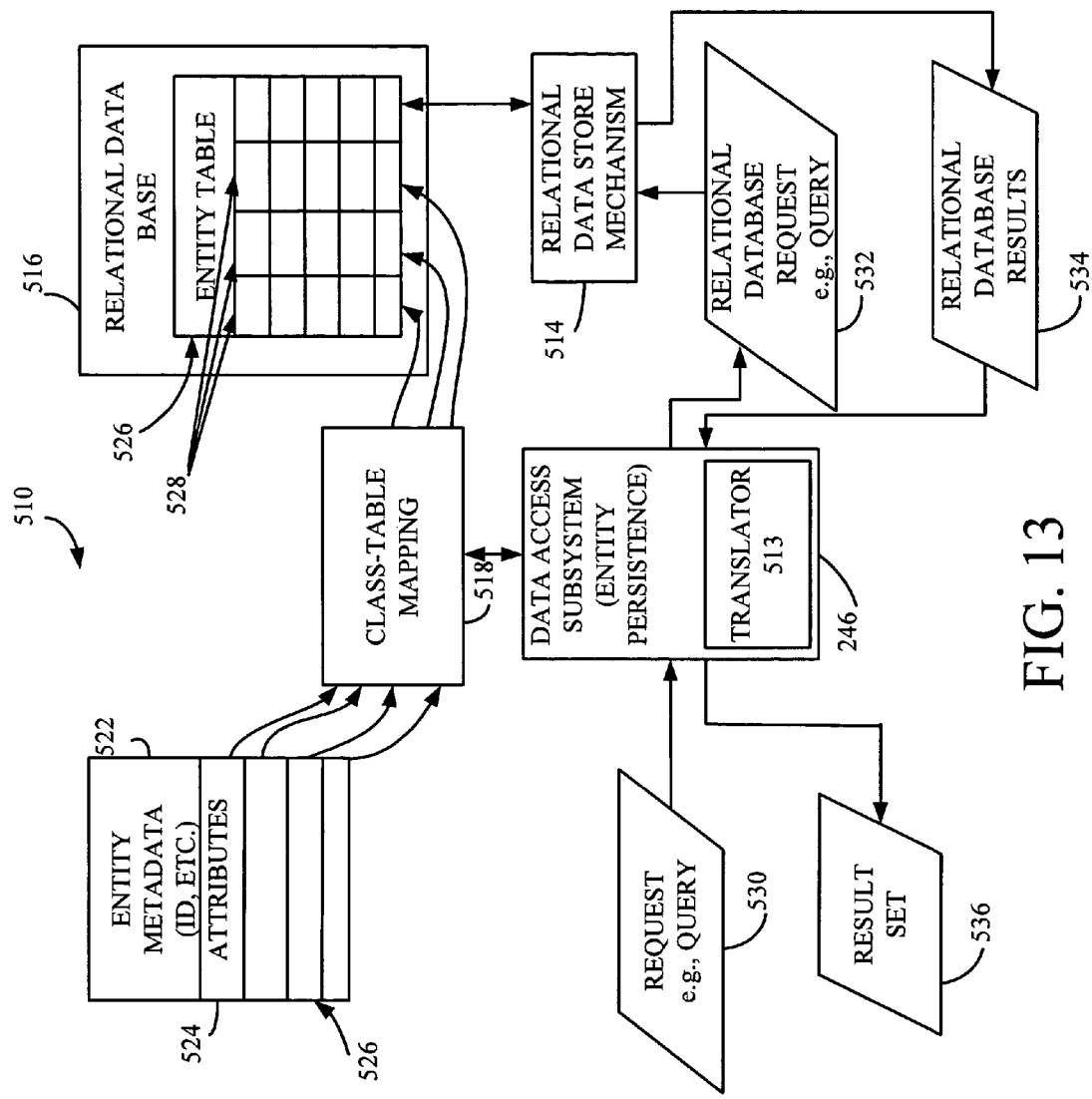
FIG. 13 is a block diagram of a data accessing subsystem.

FIG. 13 is a block diagram illustrating one embodiment of a data storage and accessing system 510 in accordance with the present invention. System 510 includes data access subsystem (or entity persistence system) 246, relational data store mechanism 514, relational database 516, and class-table mapping 518. System 510 is illustratively an object-relational (O-R) data storage system in which stored data can be referred to in terms of entities (or objects) and their properties, rather than elements of the data base schema, such as tables and columns. FIG. 13 illustrates one mechanism for doing this.

As shown in FIG. 13, the data can be organized in terms of entities 226. Each entity illustratively includes a metadata portion 522 (stored in a metadata store in metadata subsystem 248) and a remaining attributes portion 524. The metadata portion 522 describes the entity 226, while the remaining attributes 524 define further attributes of entity 226, such as the data stored therein. Each of the attributes in entity 226 is mapped to a corresponding entity table 526 and a specific column 528 in a given entity table 526.

Data access subsystem 246 can receive various forms of requests such as a query 530 which specifies an entity, or portions of an entity or group of entities, to be retrieved. Query 530 can illustratively be expressed in terms of objects ("entities") and properties, rather than in terms of tables and columns.

In any case, data access subsystem 246 receives the query 530 and accesses class-table mapping 518. In this way, data access subsystem 246 can determine the location of the data for the entities identified by query 530. Data access subsystem 246 includes a translator 513 that translates query 530 into a relational database query 532 which is suitable for input to relational data store mechanism 514. In one illustrative embodiment, relational data store mechanism 514 is a SQL SERVER database server such as that available from the Microsoft Corporation of Redmond, Wash., that accesses a relational database 516. Therefore, data access subsystem 246 receives queries 530 in terms of objects and translates those queries into an appropriate relational database query 532 that is then provided to the data store mechanism (or server) 514 which actually accesses the data in relational database 516.

Relational data store mechanism 514 retrieves the requested data and returns it in the form of relational database results 534. The results are returned to data access subsystem 246 which then formulates the relational database results 534 into a requested result set 536. In one illustrative embodiment, result set 536 is requested in query 530. Query 530 may request that the results be output in the form of one or more objects or simply as a data set. In any case, data access subsystem 246 arranges the relational database results 534 into the proper format and outputs them as result set 536.

Data access subsystem 246 hides the physical data store (mechanism 514 and database 516) from the users and developers enabling them to work in terms of entities rather than requiring them to know both the schema of database 516 and the syntax of the particular data store mechanism 514.

Entity 226 Containment Hierarchy

Figure 14:
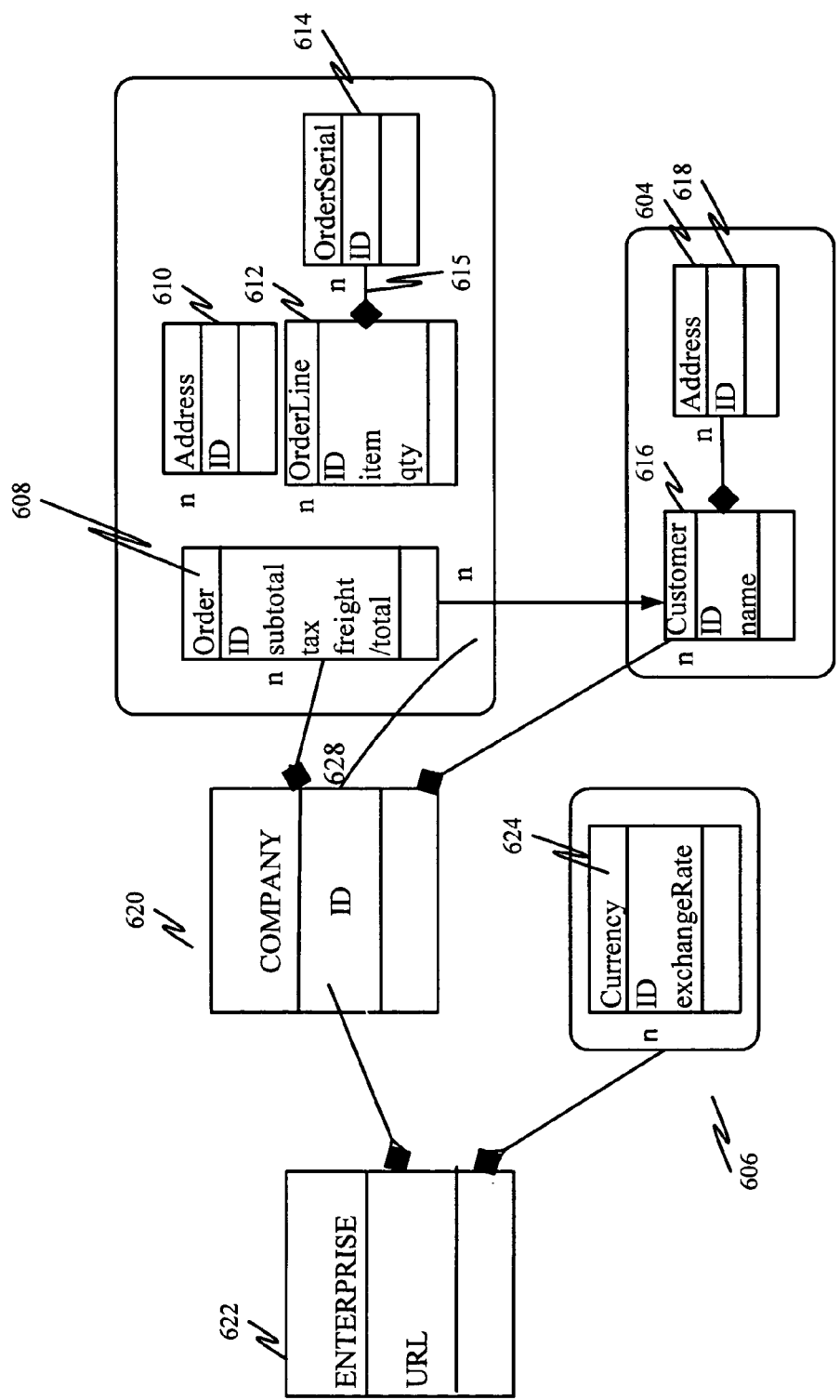

FIG. 14 is an example of a hierarchical structure 600 of an exemplary application comprising objects or entities. As illustrated, entities can be organized as members 602, 604 and 606, which can comprise one or more entities. A member, as used herein, is one or more entities grouped together to achieve a common purpose. Although modules implementing the present invention may not include references to members, a developer may want to design the application with members in mind.

In the exemplary embodiment, the entities or objects are organized in a parent/child relationship. Member 602 includes those entities that constitute an Order for a company. In particular, an Order entity 608 includes information such a subtotal, tax, freight and total properties. An Address entity 610 is a child entity of the Order entity 608 and may include information pertaining to the shipping address for a specific order. Likewise, the Order entity 608 may include a number of OrderLine entities 612, while each OrderLine entity 612 can comprise one or more OrderSerial entities 614 having further information. It should be noted that the notation "n" in FIG. 14 is used to indicate that the particular entity could comprise a number of identically structured entities. For example, as indicated above, one or more OrderSerial entities 614 can be a child entity (indicated by the diamond line 615) of an OrderLine entity 612.

In the example illustrated herein, member 604 generally pertains to Customer information and includes a Customer entity 616, where each Customer entity 616 can include one or more Address entities 618.

The Customer entities 616 and the Order entities 608 are each child entities of a Company entity 620, the set of which comprise child entities of an Enterprise entity 622. Member 606 comprising, in this example, one or more currency entities 624 is also a child of the Enterprise entity 622.

Besides the parent/child hierarchy of structure 600, there also exists, in this example, a uni-directional association between classes of entities. A class is a set of similarly structured entities. As indicated above, all of the Order entities 608 fall within an Order class. Likewise, the Customer entities 616 pertain to a Customer class. The association indicated by arrow 628 denotes that a class may know of another class. In this example, the Order class knows about the Customer class, but does not incorporate or own it such as in the case of a parent/child relationship.

Entity Keys in Entities 226

An entity manages data. The entity preserves its internal data and the integrity of its relationships with other entities. Data of the entity is accessed through properties. Each entity is a form of an abstraction. Characteristics of an entity also include that it has an identity, represented by a subclass of an abstract class "EntityKey". Within the overall hierarchy, each entity that manages data in structure 600 is location independent in that it does not know where it is stored or who owns it. However, the EntityKey is used to define its relationship with other entities and can be thought of as being represented by the connections in FIG. 14.

An instance of an entity may be contained within an instance of another entity. The contained entity is called the child, while the container is called the parent. A child instance cannot exist longer than its parent and must have one and only one parent. The set of all such relationships for an application is its containment hierarchy. This sort of hierarchy parallels many business applications. It has been found that supporting this hierarchy makes the system a better fit for developers in constructing business applications.

FIG. 14 is an example of a containment hierarchy for an application. The containment hierarchy describes the types of entities and their corresponding parent-child relationships. There is a root of the containment hierarchy, herein illustrated as the "Enterprise" container 622. The root container or entity commonly supplies the address of a server for the containment hierarchy, although classes or instances can be located on other servers or computer readable media. In one embodiment, the root entity supplies the URL (Universal Remote Locator) of the server. In this embodiment, another broad class of containers are the Company entities 620.

It should be noted that the containment hierarchy is not the same as an inheritance hierarchy. Inheritance hierarchy is a classification of relationships in which each item except the top one is a specialized form of the item above it. In the example of FIG. 14, the Order class 608 and the Customer class 616 are not specialized forms of the Company class 620. Rather, the Order class 608 and the Customer class 616 are different classes holding different types of information. This is not to say inheritance can not be present in the Containment Hierarchy. In some embodiments, an inheritance hierarchy may be present for any class. Thus, for example there can be variations within a class such as variations of the Customer class 616.

There are three forms of entities in an application. The forms include the component containers "Enterprise" 622 and "Company" 620, primary entities and supporting entities. The primary or root entity is the focus of a component container of the same name, while supporting entities are either children of the primary entity or its peers. For example, the Order member 602 consists of the Order root entity 608, while the Address 610, OrderLine 612 and OrderSerial 614 are supporting entities. The data for entities is usually stored in database tables such as described above with respect to FIG. 13. Components are a unit of logical design and do not interact with the database.

As indicated above, each of the properties in an entity is mapped to a corresponding entity table and a specific column in a given entity table as illustrated in FIG. 13. Each entity table also includes, in addition to columns for the attributes, one or more columns that identify all the parents of a particular entity. Referring to FIG. 15 and using OrderSerial by way of example, the OrderSerial Table 650 would include columns for identifiers, in particular, "Company_id" 652, "Order_id" 654, OrderLine_id 656 and Serial Number 658, which may comprise one of the attributes, and which may function as its own identifier (id).

In a relational database, interaction with the table would require specifying each of the identifiers in order to identify and work with the data associated with a particular entity, in this example, data associated with a specific OrderSerial entity 614. However, this information is inferred from its parent in the containment hierarchy. For instance, if one is working with a particular OrderLine entity 612 and now wants to inquire about, or perform an action upon, a OrderSerial entity 614, the data access subsystem 246 can ascertain which OrderSerial entity or entities the user is referring to without needing to re-identify the parents of the entity. In the present invention, the containment hierarchy allows the relationship of the tables (i.e., the identifiers) and hence, the relationship of the entities, be an implicit background piece of information. In other words, the identity of the entity is inferred from the parent/child relationship so that it does not need to be restated or managed in other ways. In a relational database system, the identifiers found in the tables used to identify the entity are called a primary key, wherein the combination of the identifiers is unique. However, typically, primary keys are just a collection of columns and have no rich behavior attached to them. In addition, user selected identifiers may only be unique within a certain scope (such as a single business unit) and not unique over the entire range of the application. Surrogate keys, which are commonly generated by the application and hidden from the user, may be unique, but they do not describe hierarchies such as who is the parent of the entity referred to by the identifier.

Another aspect of the present invention is an EntityKey that solves these problems, in particular, the EntityKey associated with each entity allows each entity to be unique throughout the containment hierarchy, as well as infer from the position of the entity within the containment hierarchy who the parents are. An entity is an object that is identified by an entity key, or stated differently, the key for an entity. An EntityKey serves the same function as the primary key on a relational table; however, unlike a relational primary key it is universally unique across the application space and is hierarchical, i.e. it is aware of its position in the hierarchy. In the architecture, the EntityKey is a defined class that is distinct from the entities. The EntityKey class can be mapped to a relational database table. Every entity throughout the hierarchy has one and only one EntityKey value. Given the key for an entity, one can retrieve the entity, whether it is on a local server, or located in a wide area network such as the Internet.

Figure 16:
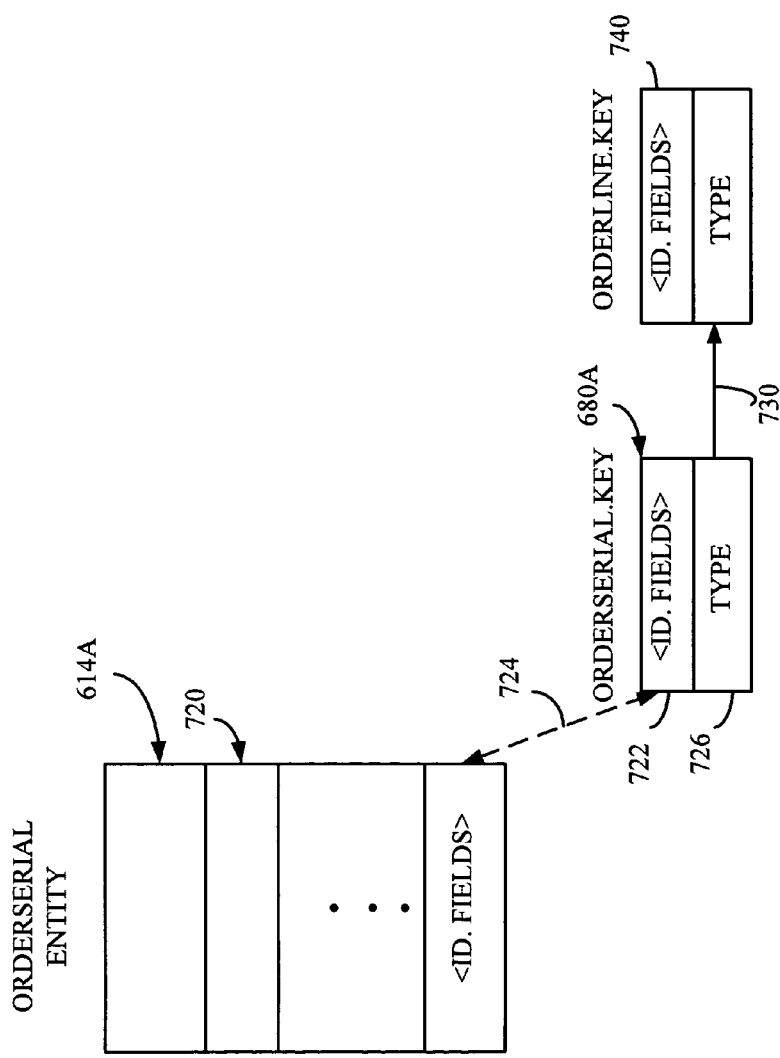

Each EntityKey contains, for purposes of this concept, three pieces of information: the type or class of the entity to which it refers, the ID of that entity to which it refers and information as to the EntityKey of the parent to that entity. FIG. 16 is a pictorial representation of an EntityKey (herein, OrderSerial.Key) 680A for a particular OrderSerial entity 614A.

Figure 17:
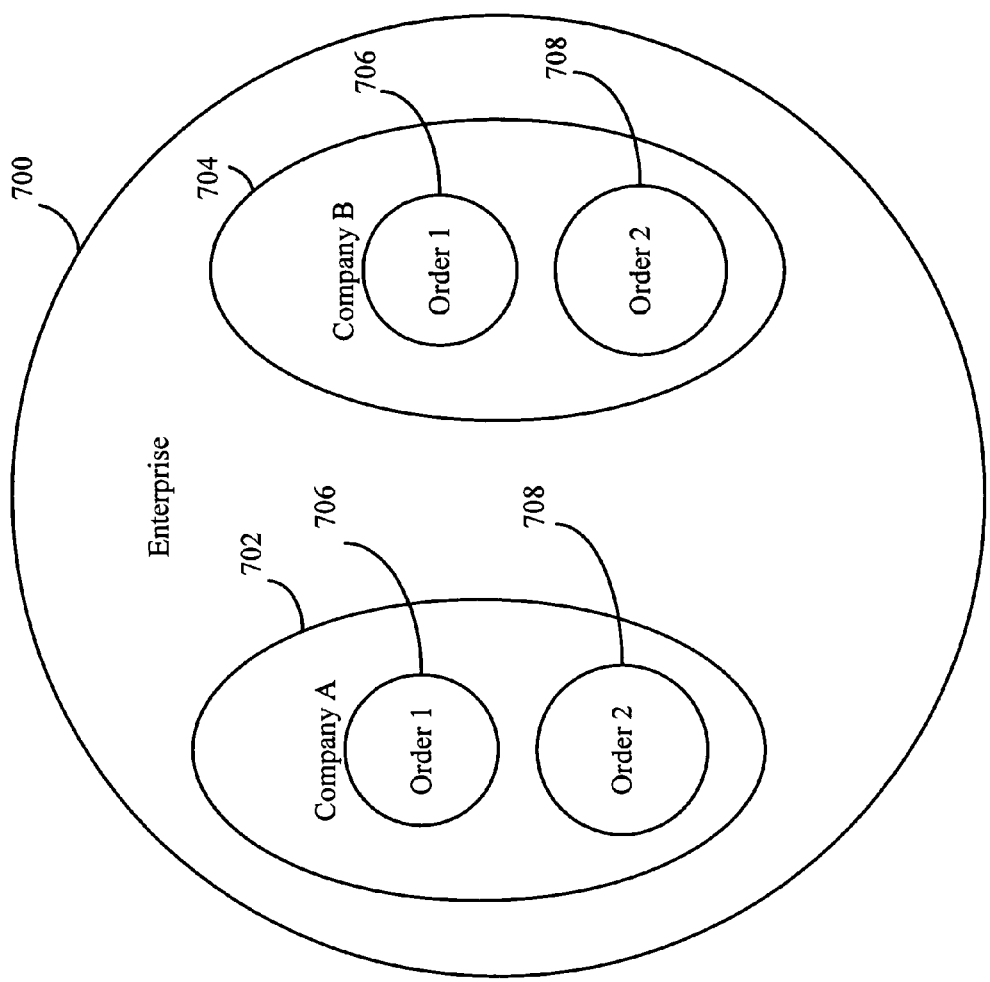

An entity in the hierarchy is fully identified by its identifier plus that of its parents. In this manner, the same local identifier can be used in two or more locations of the overall space because different parents would be involved in uniquely identifying the entity. This may be more readily apparent by pictorially representing the Enterprise space of FIG. 14. Referring to FIG. 17, the Enterprise is indicated by circle 700. The Enterprise 700 can include a plurality of companies, herein Company A 702 and Company B 704. However, each Company 702 and 704 can have two Orders, both having the same identifier, herein "Order 1" 706 and "Order 2" 708. Nevertheless, entities within Company A 702 would still be uniquely identified with respect to entities of Company B 704 although the identifiers for Order 1 706 and Order 2 708 have been used within each Company because each of the entities is uniquely identified by its associated key having the parent/child relationships of the hierarchy.

It should be noted that in many applications, the data for Company A is stored in a completely different database then the data for Company B.

There is also a separate, independent class associated with OrderSerial 614 herein identified as OrderSerial.Key. In general, the EntityKey is of a separate class than the class it refers to. Entity 680A is an example of an object of the OrderSerial.Key class. Referring back to FIG. 16, the OrderSerial entity 614A contains all the attributes 720 relevant to the Order Serial, which could be any number of attributes. The OrderSerial.Key 680A contains a subset of one or more attributes of the OrderSerial entity 614A specifically, the OrderSerial.Key includes identifier attributes 722. Thus, if OrderSerial entity 614A includes a thousand attributes, but two of the attributes make each OrderSerial entity unique, those attributes get copied into the OrderSerial.Key to form the identifier back to the entity. Arrow 724 represents the common identifier attribute or attributes between entity 614A and entity 680A.

The attribute or attributes of the OrderSerial.Key that make each entity of OrderSerial unique is the first element of an EntityKey, which thereby allows the key to be associated with a particular entity.

A second element of an EntityKey is the type 726 of the entity to which it has an identifier. In the present example, the type of the class is OrderSerial.

A third element of an EntityKey is information about the EntityKey of the parent of the entity. In the present embodiment, this information is a reference, indicated by arrow 730, to the parent key 740 corresponding to the parent of entity 614A. In other words, the third element could be a reference to another key. This structure makes EntityKeys recursively defined However, it should be understood that some or all of the parent key information could be stored in the EntityKey directly, if desired. It should be understood that these forms and other similar forms for storing and accessing EntityKey information is intended to be covered herein.

Figure 18:
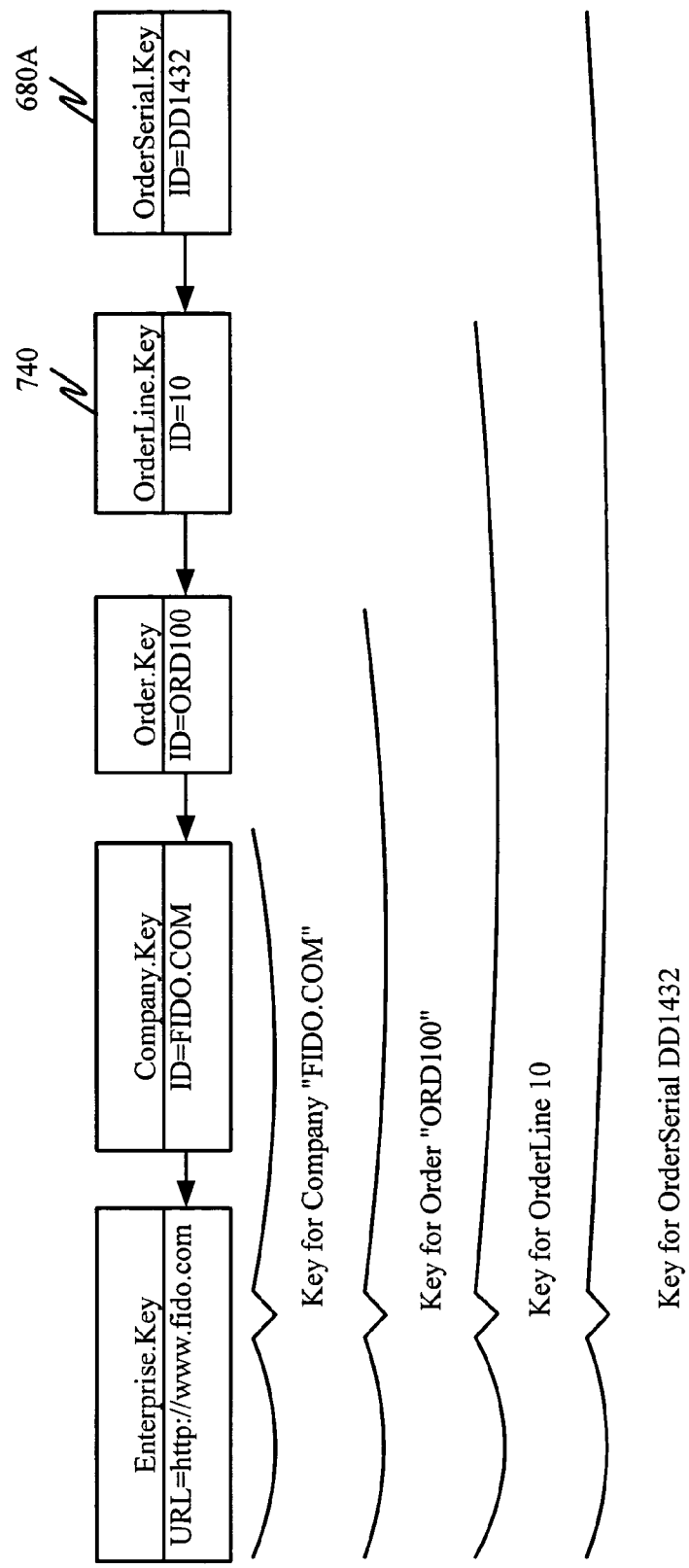
FIG. 18 illustrates a key structure.

Referring now to FIG. 18, EntityKeys are provided for an entity of Company, an entity of Order, an entity of OrderLine and entity of OrderSerial. In this example, the ID constitutes one field and the type can be ascertained from the name of the key. For example, type OrderSerial is obtained from the name OrderSerial.Key. References to parent keys are illustrated by arrows. Thus, again, the location of an entity in the hierarchy is completely defined by the associated EntityKey.

In the recursive form of storing EntityKeys, it should be noted that although each EntityKey includes type or class information to which it pertains it does not know the type or class of its parent. That information is found by looking at the type information in the parent key that it references. This is a particularly advantageous feature for it allows classes to be reused throughout the containment hierarchy. Referring back to FIG. 14, it is illustrated that the Order class 602 has a child class of Address 610. Likewise, the Customer class 616 also has a child class of Address 618. The Address classes 610 and 618 are actually conceptually the same; but the instances are disjoint since they are under different parents. However, the entities are uniquely defined in each form of Address class, wherein each Address class 610 and 618 may be stored in a different database table. In this manner, one can describe a position in the containment hierarchy without forcing a class to forever be in that position.

As explained above, each EntityKey has information such as a reference to its parent key, but it does not know what type of parent it is. The decision of what type of parent is made or defined by the mapping(s) for the complete set of classes and tables.

The set of identifiers 722 as illustrated in FIG. 16 of an EntityKey corresponds to the primary key columns of a table holding the data for that entity. Referring to FIG. 15, assume that the primary key of the table holding OrderSerial entities is Company_ID 652, Order_ID 654, OrderLine_ID 656, and Serial Number 658. The identifier attribute 722 in the OrderSerial.Key 680A is mapped directly to the last of the primary key columns, while the parent keys of 680A are mapped to columns 652, 654, 656 in a similar fashion. This EntityKey to database key correspondence also extends to foreign keys. All simple associations between entities are implemented using keys. For example, in FIG. 14, Order.Key would have a reference of type Customer.Key that implements the association from Order to Customer. This key can easily be mapped to the Customer foreign key in the Order table.

It should also be noted that tables are commonly designed with surrogate rather than intelligent keys. An intelligent primary key is seen and specified by the end user, while a surrogate primary key is generated by the application and hidden from the user. Surrogate keys are often used to allow renaming the user visible identifier of a table without database impact or to save space when the size of the primary key is very large and often referenced in foreign keys. When surrogate keys are used, the table will have the surrogate primary key and an alternate key having the user visible identifier.

Both intelligent and surrogate EntityKeys are supported. In the present embodiment, if a surrogate EntityKey is used its ID properties are private (since they are generated and hold ho meaning to the consumer of the entity); otherwise they are public.

Class Key

Another related abstraction is the Class Key. Since a given entity can be used in more than one place in the containment hierarchy, there is a mechanism for indicating which node in the hierarchy to process. The Class Key is that mechanism and contains two pieces of information: the type of the entity to which it refers and information as to the Class Key of the parent of the entity. Note the similarity to the definition of the EntityKey. In fact, the EntityKey is a derivative of and inherits from the Class Key, thereby allowing an EntityKey to be supplied anywhere a Class Key is required. Thus the Class Key is also hierarchically defined. The illustration of FIG. 18 of an EntityKey can be changed into an illustration of a Class Key by simply removing the entity identifiers (IDs).

Generally the Class Key can be used to reference a node in the containment hierarchy as it pertains to classes of entities, particularly describing uniquely a name for each class in the hierarchy as well as its position in the hierarchy. In contrast, the EntityKey provides a unique name for each entity in the containment hierarchy and describes its position in the hierarchy.

The EntityKeys and Class Keys are used when performing create, read, update and delete operations on business objects or entities. For example, when reading an entity, a parent key referring to a component container should be provided. This provides a scope for the read and also makes it easier for the developer to specify a complex location in the hierarchy.

Figure 19:
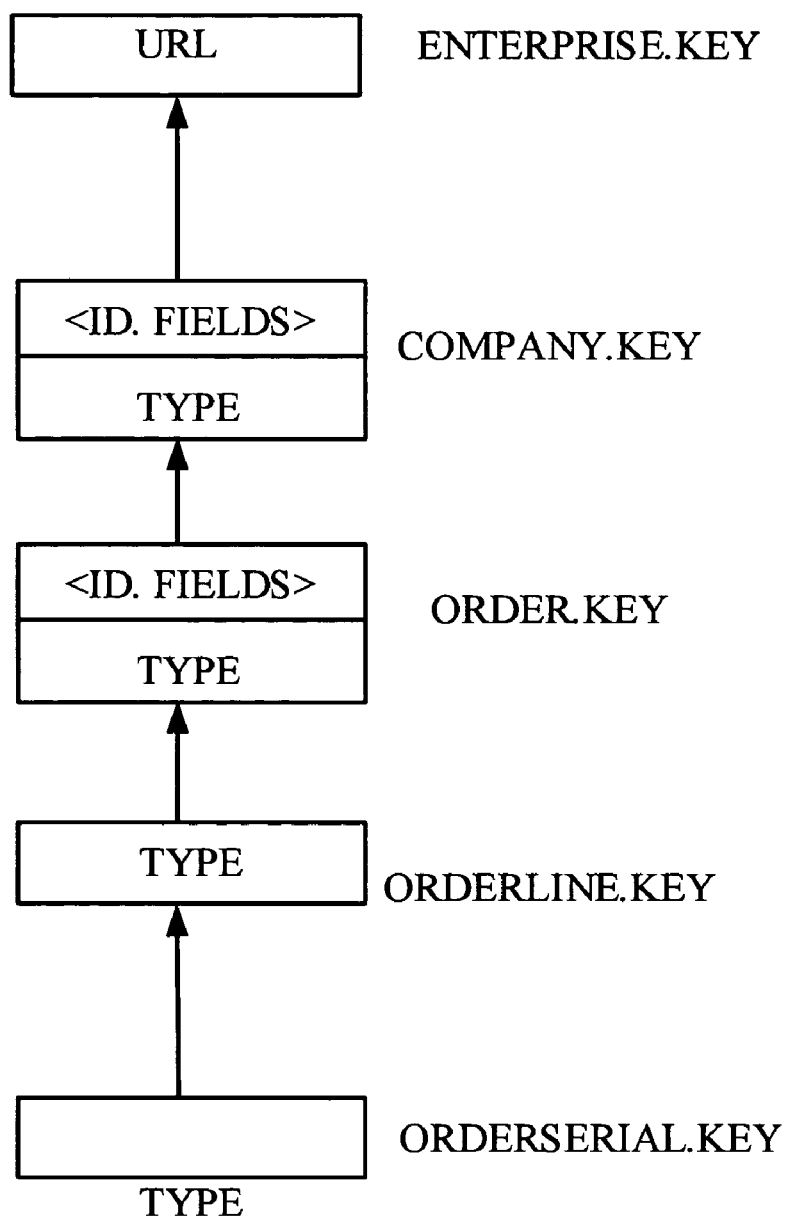
FIG. 19 further illustrates the key structure.

Besides EntityKeys and Class Keys, another form of key is a blend between these keys. As discussed above, an EntityKey is a form of a Class Key, but includes further information to a particular entity (i.e., its identifier attributes). By simply using a chain of Class Keys followed by Entity Keys, all the entities under a particular parent can be ascertained. FIG. 19 illustrates an example of a blended key 844. In this example, EntityKeys have been provided for the Enterprise, Company and Order, which in turn has specified a particular Order entity. However, since the OrderLine.Key and the OrderSerial.Key do not include Ids, they are Class Keys. The blended key 844 of FIG. 19 could be received by the data access subsystem 246 to formulate a query for the data store mechanism to retrieve all series for a particular order, irrespective of line.

Foundation Services 252

Creation of types based on the framework (such as entities, factories, keys, processes and services) is accomplished by an activation system within the framework. All other types (such as value types) are created with other operators. Since creation of entities occurs in one place, several features can be implemented. First, the foundation services subsystem 252 can find the correct version assembly given a request to create an instance of some type. In addition, entity substitution allows developers to add new functionality to a class without impacting existing business logic, by letting them substitute a subclass of any type when an instance of that type is requested. A form of entity substitution can also be used in which a subclass is a proxy automatically generated by activation. The proxy can add a variety of functionality including system call tracking when an instance has changed, and insuring read only access for some classes.

Diagnostics and instrumentation provide logging, tracing, and accounting services within foundation services 252. An application can be instrumented with calls to diagnostics for it to perform these services. The application framework can use run-time call interception to call diagnostics on behalf of application developers.

Role-Based Security Subsystem 240

Role-based security subsystem 240 provides basic primitives necessary to build a variety of security schemes. For example, User and Roles are classes of entities provided by security subsystem 240. The subsystem 240 can map any number of identities to a single User class, allowing multiple authentication mechanisms to be used. Security subsystem 240 also provides a framework for applying custom permissions between a User or Role and an entity. For example, certain querying views can apply security to query definitions indicating which Users or Roles can read, update, or execute a query. The permissions feature of subsystem 240 provides a consistent mechanism for creating custom permissions and also provides much of their implementation.

A task is an entity or activity built using the permissions framework described relative to security subsystem 240. User and Role classes can then be given permission to execute a task. To use task security or method involves two steps. First, the task must be defined using a custom attribute to specify the task ID, name and description. Next, an imperative or declarative security check must be provided for the task with another attribute. This "TaskPermissionAttribute" throws an exception if the security check fails. The following table 5 illustrates pseudo code for performing these steps.

TABLE 5

```
public class Microsoft.GL.Transaction {
    // ...
    [Task("Microsoft.GL.Transaction.Post",
        "Post",
        "A posting routine for General Ledger")]
    [TaskPermission(SecurityAction.Demand,Task="Microsoft.GL.
    Transaction.Post")]
    virtual public void Post( ) {
        // ...
    }
    // ...
}
```

It defines a task with a "TaskAttribute" and specifies a declarative security check with "TaskPermissionAttribute". Should the security check fail, an exception is thrown and the method does not execute.

Data can also be secured using security subsystem 240. Each application may have different requirements for how data access is restricted, so rather than providing a single solution, security subsystem 240 provides a data access framework. A basic mechanism intercepts all data access requests to data access subsystem 246 by providing secure class wrappers that implement each of the interfaces to data access subsystem 246, and adds the ability to specify a dynamic view to use when accessing the data. Administrators can create the dynamic views to define data access permissions for Users and Roles. A dynamic view combines a security data access policy with a list of properties on the underlying entity that can be seen and updated. User and Roles are then given access to use a particular dynamic view when accessing data. The secure data access policy defines a data access security policy and developers can create custom policies by deriving from it and adding their custom logic.

Three illustrative examples of security schemes include a pass though filter. When a request is made of data access subsystem 246, this filter adds restrictions to a "where" clause of the criteria, restricting the entities returned. Another approach is an entity-by-entity access control approach. A join table lists each entity to which a User or Role has access. Yet another approach is a hierarchical filtering approach. For example, a manager may be able to view a subordinate's information but not vice versa. This is usually implemented by flattening the hierarchy into a new entity and adding a join to that entity in the criteria of the access request made of data accessing subsystem 246.

Reporting and Query Services Subsystem 232

Figure 20A:
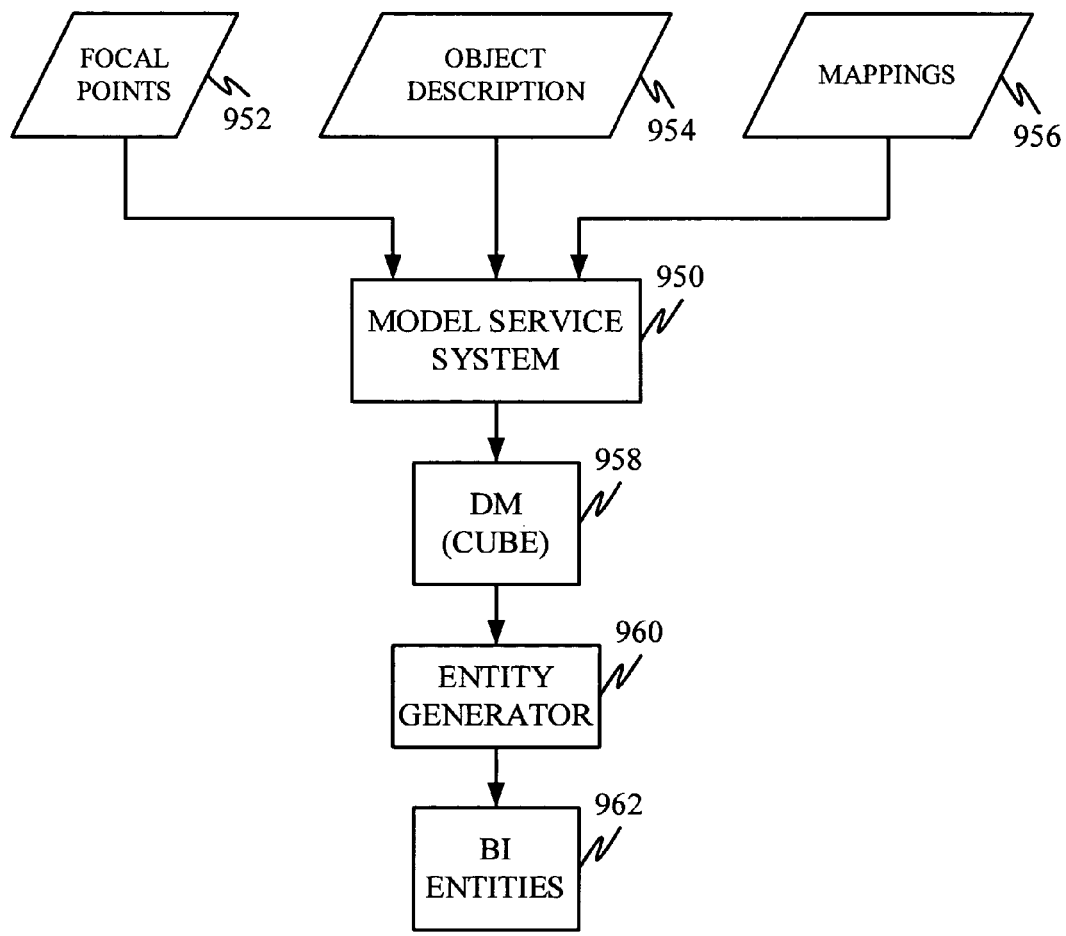
FIG. 20A is a block diagram of a system for creating business intelligence entities.
Figure 20B:
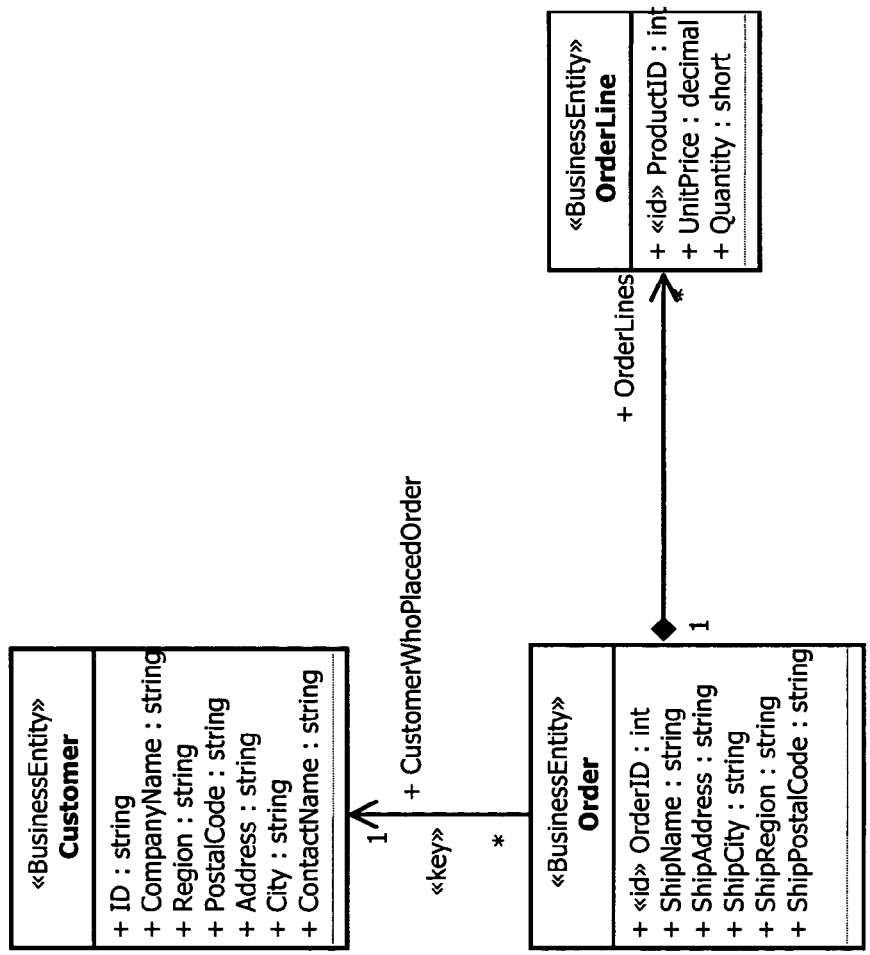
FIG. 20B is a UML class diagram of a plurality of entities.
Figure 20C:
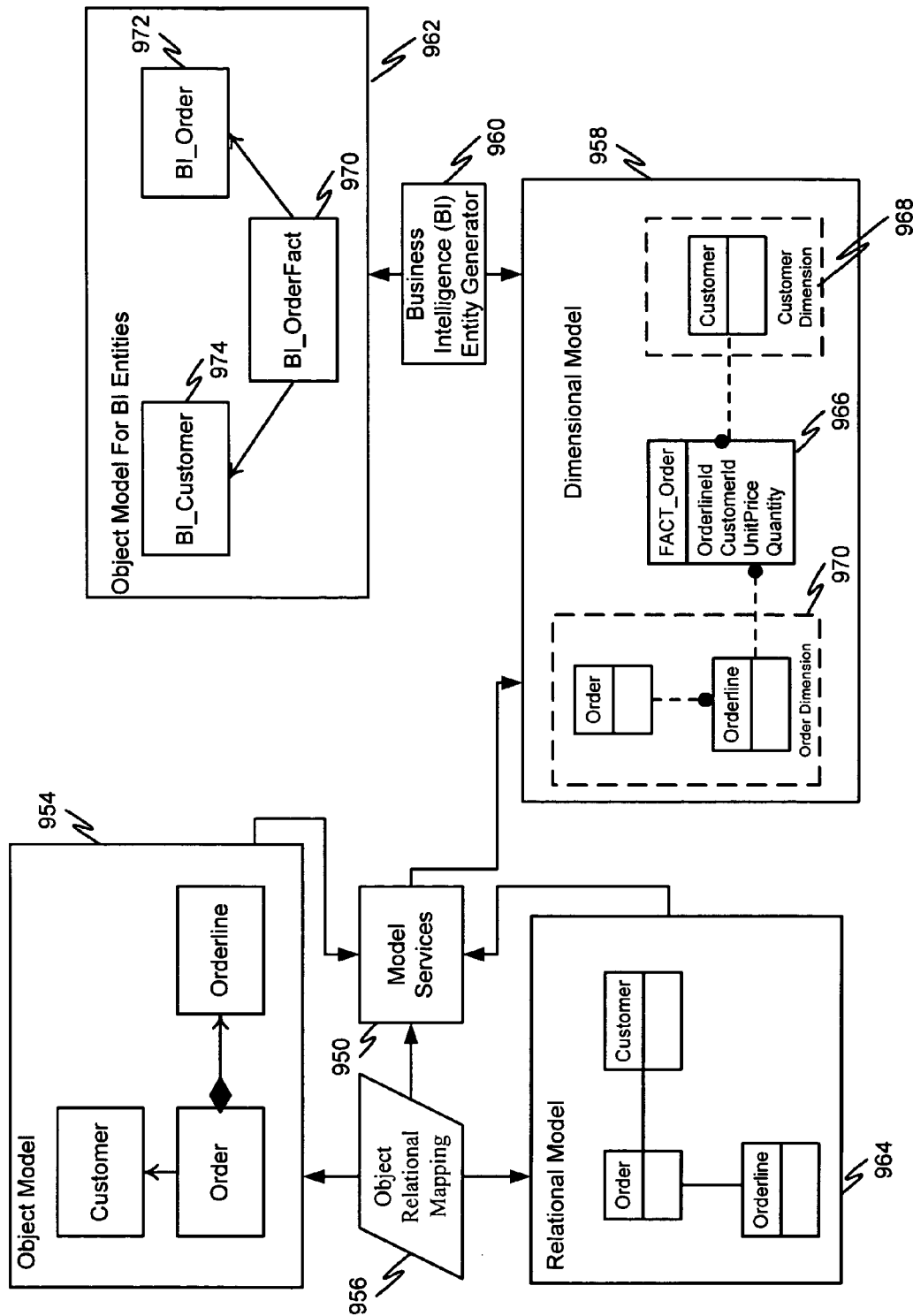
FIG. 20C is a more detailed block diagram of a system for creating business intelligence entities.

FIGS. 20A, 20B and 20C illustrate a system for generating queryable entities (referred to as business intelligence entities or BI entities) from an object model description of a user's data stored in the relational database.

FIG. 20A is a simplified block diagram of one embodiment of generating queryable BIs 262 from an object model. FIG. 20A illustrates a model services system 950 that takes, as inputs, a specification of focal points 952, an object description 954 and a set of persistent data store mappings 956. System 950 then produces a dimensional model 958 based on the inputs. FIG. 20A also illustrates an entity generator 960 that generates a set of objects (or entities), referred to herein as business intelligence entities (or BI entities) 962, based on the dimensional model 958.

Focal points 952 represent certain data in the object model that is marked by the user as being a focal point of analysis. Focal points 952 can illustratively be specified in an XML specification file.

Object description 954 is an input which describes the object orientation relationships in a set of metadata corresponding to a set of objects. This can take the form of, for example, a UML class diagram. One example of a UML class diagram for a plurality of business entities (Customer, Order and OrderLine) is illustrated in FIG. 20B.

Persistent data store mappings 956 map the data referred to by the object model to the persistent data store, in one illustrative embodiment the relational database 516 shown in FIG. 13. These are illustratively created by the user in the form of a map file.

Model services system 950 receives inputs 952, 954 and 956 and automatically generates a dimensional model 958 based on those inputs. In accordance with one embodiment of the present invention, dimensional model 958 is inferred from the inputs supplied by the user, and there is no requirement for a second set of developers to be involved in recreating the business logic to obtain model 958. In one embodiment, and as will be discussed in greater detail below, model services system 950 uses the associations and compositions in the object model specified by the object model description 954 to infer foreign key relationships in dimensional model 958. System 950 also uses the focal points of analysis defined by the user in file 952 and the persistent data store mappings 956 to create dimensional model 958 and access data through model 958.

However, even a system which automatically generates dimensional model 958 can be improved. For example, obtaining information through dimensional model 958 still requires the user to know MDX or some sort of dimensional model querying language. Therefore, in accordance with another embodiment, entity generator 960 is provided. Entity generator 960 creates business intelligence entities 962 in the form of objects, from the cubes and dimensions in dimensional model 958. This is also described in greater detail below.

FIG. 20C illustrates the system shown in FIG. 20A, in greater detail. In the example illustrated in FIG. 20C, the object model is represented by object description 954, and the mappings 956 are shown between the object model representation 954 and the relational database representation 964 which represents relational database 516. FIG. 20C also shows dimensional model 958 in greater detail. Dimensional model 958 includes a Fact table 966 along with a plurality of dimensions 968 and 970 (the Customer dimension and the Order dimension). Each of the dimensions is formed of one or more tables. It is also worth noting that Fact table 966 includes the OrderlineID and CustomerID as foreign key references.

FIG. 20C also illustrates one embodiment of a set of BI entities 962. In the example shown in FIG. 20C, the BI entities 962 include a BIOrderFact entity 970, a BIOrder entity 972 and a BICustomer entity 974. Entities 972 and 974 are related to entity 970.

By looking at the entities and their relationships in object model description 954, it can be seen that the dimensional model will require a snowflake-schema, such as that shown in dimensional model representation 958. It can thus be inferred that two dimensions will be created, Order and Customer. The Order dimension will have two levels, Order and OrderLine. The measures (or numeric values) in the Fact table 966 will include UnitPrice and Quantity and will come from the OrderLine entities.

Figure 21:
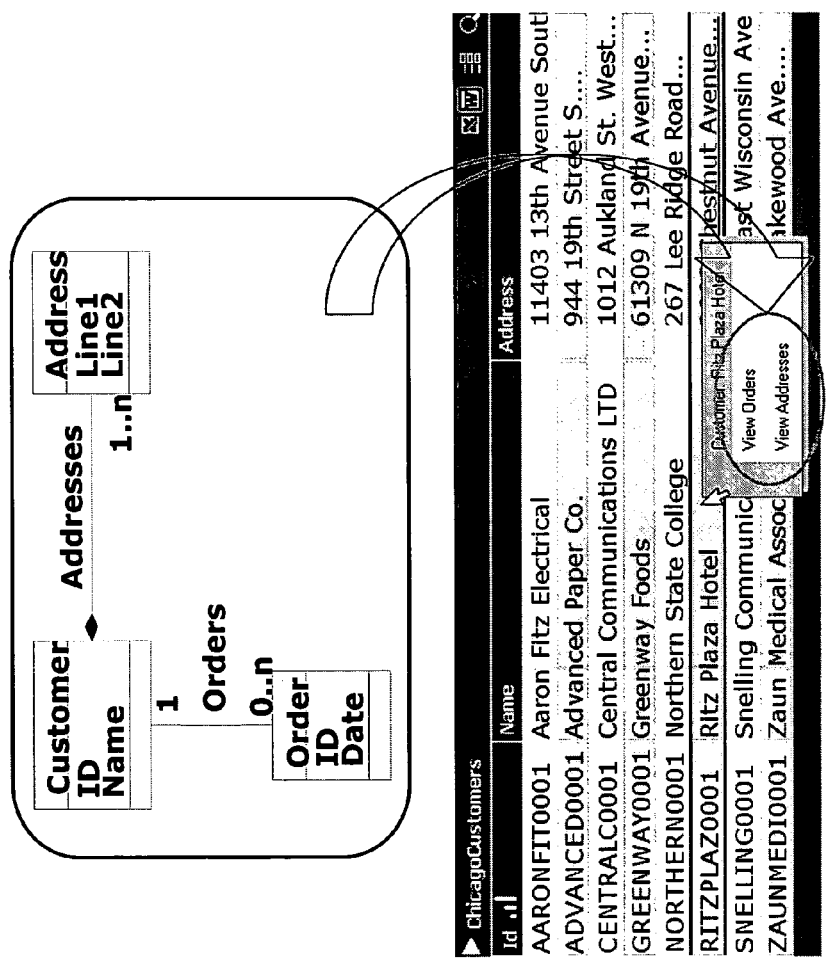
FIG. 21 illustrates navigation using hyperlinks.

Reporting and query services subsystem 232 also stores information regarding entity relationships to provide linking capabilities to other queries, allowing the user to perform guided navigation of related information. For example, FIG. 21 shows a type of model and how subsystem 232 uses that information. The model illustrated in FIG. 21 shows that a Customer has zero or more Orders and is the parent of its Addresses (indicated by the filled diamond). The web page at the bottom of FIG. 21 shows a customer list. A context menu is open on one of the customers, allowing navigation to the orders and addresses of that customer. Selecting "orders" from that menu, for example, displays that customer's list of orders.

No code is required to perform this function beyond the Customer, Address and Order entities. There is a variety of information associated with, but not directly part of, an entity. That information includes a list of associations to other entities, valid work flow state transitions for an entity, tasks that can be performed against an entity, and hyperlinks for web sites related to the entity. In FIG. 21, the context menu has two associated entities.

Figure 22:
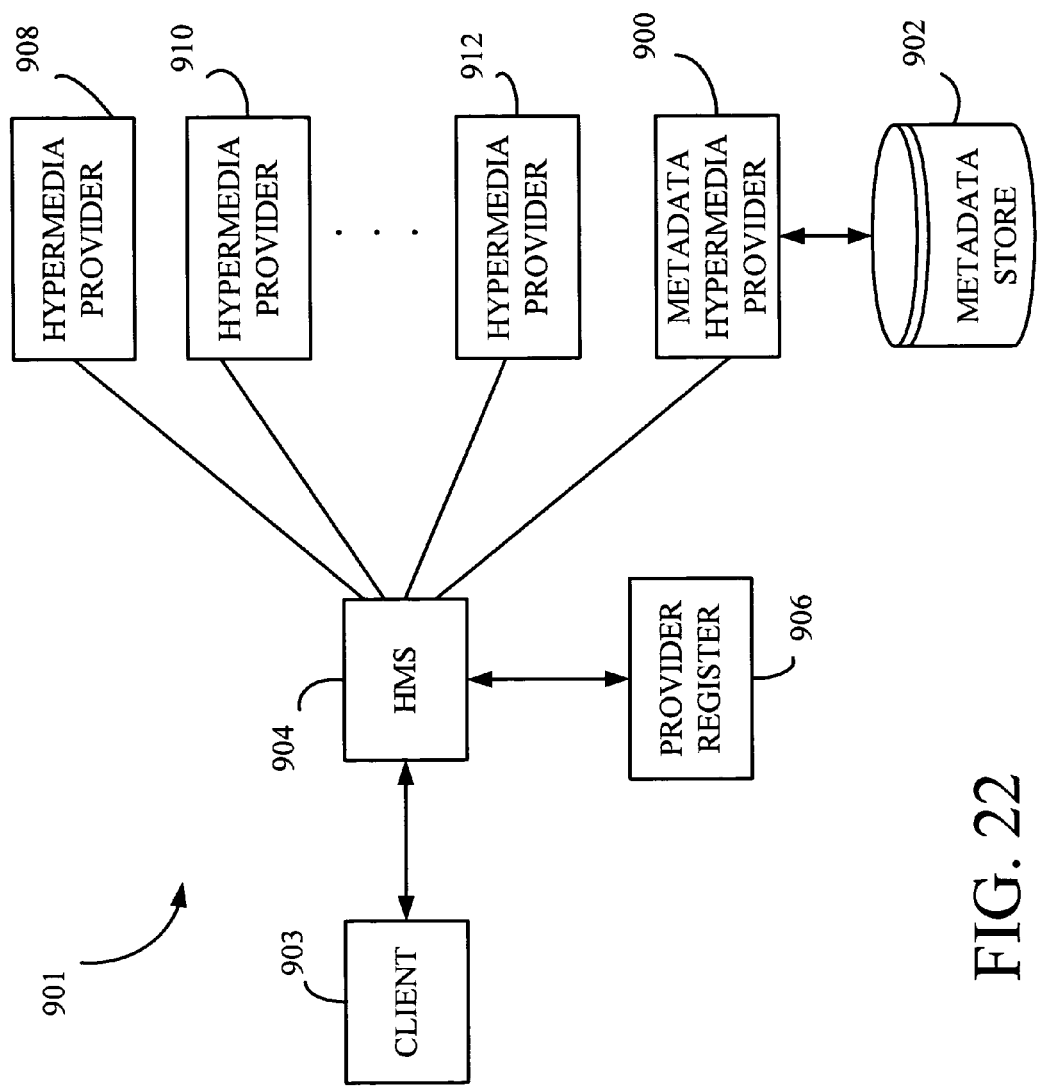
FIG. 22 is a block diagram illustrating the manipulation of hyperlinks.

FIG. 22 illustrates a hypermedia subsystem associated with subsystem 232 to provide a common query interface on the disparate pieces of information associated with an entity in order to allow the information to be extended by users and developers. The interface is based on a hyperspace, which is a universe of nodes connected by links. An entity is an example of a node and tasks or associated entities are examples of links.

As mentioned above, when developing an application, it is common for a set of objects (such as business objects or entities in a business application) to be defined. Such objects in a business application may include, for example, a "Customer" object, a "SalesPerson" object and an "Order" object. These objects (entities) are interrelated through different associations. For instance, an "Order" has both a "Customer" and a "SalesPerson" associated with it. Since these associations exist in the problem domain of the application, they are associations that the end user typically understands. Therefore, it may be beneficial to allow the end user to navigate between these associations.

The information that defines these associations is captured in a metamodel (or object model) of the applications as they are being developed. This information is typically stored as metadata. For example, FIG. 20B depicts a relationship between an "Order" entity and a "Customer" entity that is modeled during the application development process.

There are known tools which can be run against object models generated during development of an application. Such tools compile the models into association metadata. In accordance with an illustrative embodiment, this is done and the association metadata is stored.

FIG. 22 is a block diagram of an embodiment of hypermedia system 901 that takes advantage of the stored association metadata. System 901 includes a client 903, hypermedia service 904, and a plurality of hypermedia providers 908, 910 and 912. FIG. 22 shows that system 901 includes a metadata hypermedia provider 900 which is connected to a metadata store 902.

The metadata associations developed during the application development process (such as the information shown in FIG. 20B which illustrates an association between an "Order" entity and a "Customer" entity) is stored in metadata store 902.

It is assumed that metadata hypermedia provider 900 has properly registered with hypermedia service (HMS) 904 and its link and identification data that identifies it as a link provider resides in provider register 906. Client 903 first generates a hypermedia request (or link request) specifying objects that are the source of the links sought by the client, and which categories of links are to be retrieved. This request is received by HMS 904. HMS 904 then forwards the request on to the appropriate providers. Providers 908-912 simply return the requested links that they are configured to provide. The link request can also be forwarded by HMS 904 to metadata hypermedia provider 900. In that case, provider 900 analyzes association information contained in metadata store 902. Provider 900 examines each association in metadata store 902 which has been requested and determines whether the user has rights to access the associated entities. Provider 900 can determine whether the user has rights to access the associated entities by accessing a security subsystem, or in any other suitable way. Provider 900 then creates a link for each association for which the user has access, and places association information in the link. Provider 900 identifies (using terminology defined, for example, by the Unified Modeling Language (UML)) simple associations and composition associations; these can have a variety of cardinalities, such as 1-1, 1-many or many-many relationships. Provider 900 also identifies inheritance associations. For each association located by provider 900, provider 900 creates a link between the source node and the associated node.

The links are returned from provider 900 to HMS 904, and HMS 904 aggregates all returned links and forwards them on to client 902. In one embodiment, provider 900 does not return the associated node, but instead returns a query whose results, if executed, include only the associated node.

Figure 23:
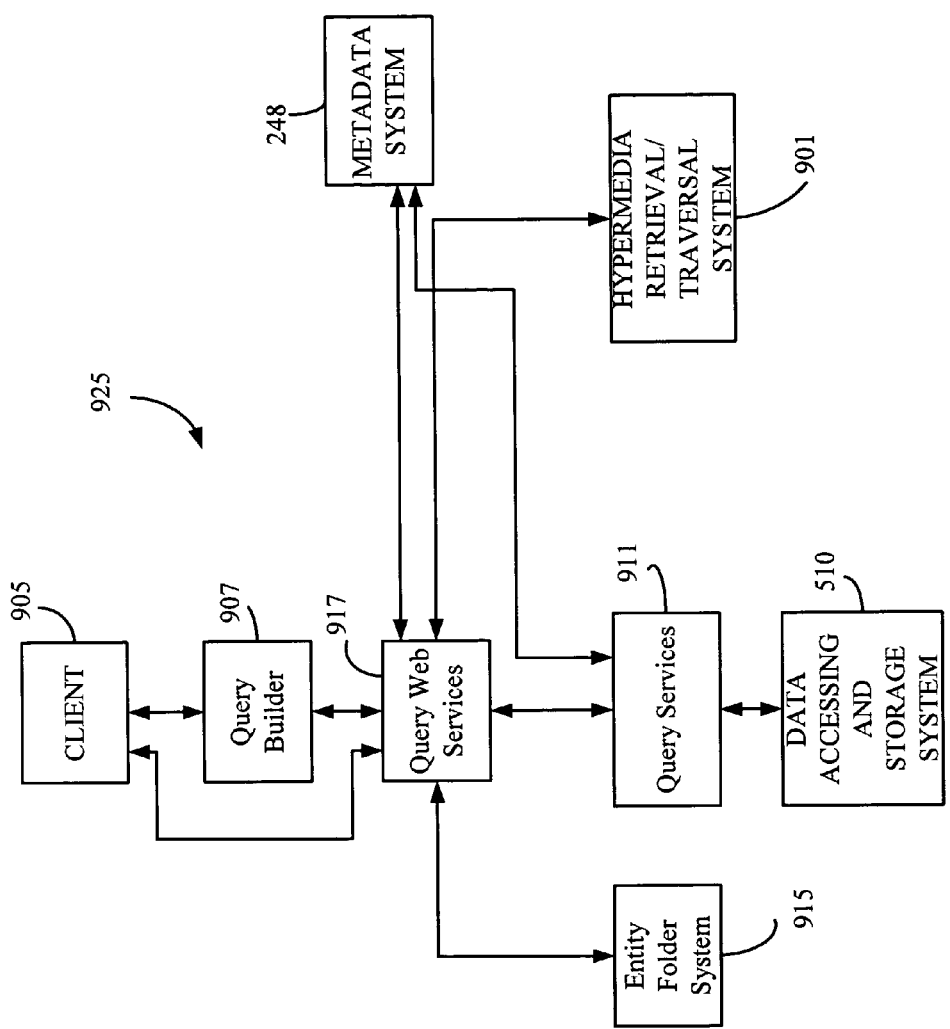
FIG. 23 is a block diagram of a query services subsystem.

FIG. 23 is yet another embodiment of a query service system associated with subsystem 232 in which query services are rendered to a client.

FIG. 23 is a block diagram of a query service system 925 that forms part of subsystem 232 in accordance with one illustrative embodiment. System 925 shows that a client 905 is operably coupled to a plurality of functional resources including query builder 907, metadata subsystem 248, hypermedia retrieval/traversal system 901 (illustrated in FIG. 22), query services system 911 (which is, in turn, coupled to data accessing and storage system 510 illustrated in FIG. 13), and entity folder system 915. Client 905 is connected to the functional resources (other than query builder 907) through a query web services component 917.

In one illustrative embodiment, query web services component 917 is a set of objects that expose a set of interfaces (such as application programming interfaces—APIs) having methods that can be invoked by client 905. When the methods are invoked (i.e., when client 905 writes to the API), client 905 can employ the functions provided by the systems to which it is connected. Thus, query web services component 917 wraps the functions of systems 248, 510, 901, 907, 911 and 915 and provides those functions to client 905 and allows client 905 to access those functions through the interfaces on query web services component 917.

The systems can perform a wide variety of different functions, other than those described with respect to the systems below, or additional functions in addition to those described.

Query builder 907 can be any system for building queries against a database system, such as system 510. Therefore, a detailed discussion of builder 907 is not provided. Suffice it to say that query web services component 917 provides a number of helpful functions, which can be used by builder 907 in creating a query based on inputs from client 905. These functions are discussed below.

Entity folder system 915 is a system for storing queries or references to queries in a hierarchical storage system (such as a folder system). A number of aspects of query folder system 915 are discussed in greater detail below.

Query services component 911 defines a query. Query web services component 917 interacts with component 911 to define queries and to perform, create, retrieve, update and delete (CRUD) operations on queries. Component 917 also interacts with component 911 to execute queries. Query service component 911 translates defined queries into a form suitable for data accessing and storage system 510 (shown in FIG. 13) and performs the necessary interaction with system 510 to have the queries executed against the database.

Metadata subsystem 248 stores medadata about objects in the system. The metadata indicates what objects are available to query, and what properties on those objects are queryable. Both system 917 and system 911 access metadata subsystem 248 during processing.

Component 917 exposes an interface with a plurality of methods. Some methods are provided for installing and removing query web services component 917 from a system.

Additional methods can be invoked to load a query from folder system 915, execute a query in system 510, perform a process request (such as traversing a hypermedia link at hypermedia retrieval/traversal system 901) and to delete a query stored in query folder system 915.

It should be noted that in one embodiment, a single method (such as a ProcessRequest method) can be used to perform all query-related operations (such as load, execute, create, save, delete, traverse a hyperlink, move next, move previous, etc . . . ). Still other functions are helper functions that allow a client to more easily perform these operations.

Further, methods can be invoked to perform manipulations in query folder system 915. For example, the methods can be invoked to list a folder, create a folder, delete a path through the folder system, or copy a path through the folder system.

Further methods can be invoked to retrieve metadata from metadata subsystem 248 to aid client 905 in building a query. Pieces of the metadata can be pulled by client 905 into a new XML element used to define a query (e.g., a QueryDefinition) . For example, the methods can be used to obtain basic views in the system and to obtain properties and relationships that can be viewed. The methods dealing with views allow a client to create queries by supplying them with lists of available views which can be used as the basis for their query. Metadata about these views, such as lists of available properties and lists of associated views, can also be retrieved. Clients can use this information to create queries that have multiple, joined views, complex restrictions with system variables and user-supplied parameters, and multiple sorts. Thus, the methods allow expression variables to be retrieved as well.

Another method allows the client 905 to obtain the location of the schema used to define the format that the output will conform to and that the input must conform to. One embodiment of an object model that defines the classes that are used to define a Query and perform create, retrieve, update and delete (CRUD) operations on the Query, provides methods that only allow a client to build a valid query. For example, if the client is building a Query on a Customer, then these methods only allow the client to select properties on the Customer entity.

User Interface Subsystem 236

The user interface subsystem 236 provides a user interface or "presentation" portion of application framework 224. This subsystem supports the application objectives of automating business processes and the management, visualization and analyses of business data by providing facilities to visualize, manage and analyze data and initiate processes.

A typical deployment of a business application may contain thousands or even millions of business entities. Further, these business entities have a complex web of interrelationships. A given customer will have many orders. A given order will have many line items which are further related to many inventory items. Inventory items are related to vendors which supply the items.

The query services subsystem 232 provides the ability to find business entities by filtering them and navigating through them. User interface subsystem 236 facilitates managing the business data by performing create, read, update and delete operations on it. A related set of business entities managed by subsystem 236 can be referred to as a document. Managing business documents is very different from visualizing them because visualization is a read only action, while management is a modification action within a single document.

Modification brings business logic into play. Business logic is used in many ways to provide a desirable user experience. For example, assume that a user specifies a customer for creation of a sales order, and business logic requires verification that the customer exists. This validation is provided by user interface subsystem 236 so that a user will not be required to wait to be notified of such a problem until the database has flagged the problem by identifying lack of referential integrity.

In addition, defaulting provides a business application user with an interface that allows the user to create documents with as few keystrokes as possible. For example, after assigning a customer to an order, the order's currency can be defaulted to the customer default currency. Of course, many other properties can be defaulted as well.

Further, document-relative calculations are coordinated. For example, when a line item is added to an order, the subtotal and total of an order must be updated. While this appears simple, it quickly becomes more involved because adding a line item may require the recalculation of taxes which can, in turn, invoke highly complex business logic.

These examples are only illustrative of the uses of business logic on user interface subsystem 236.

User interface subsystem 236 also facilities the processing of business documents. As discussed above, the hypermedia subsystem in subsystem 232 can act as a repository for information that describes what operations (or processes) can be performed on a business document. This list of available operations can be displayed which in turn means that the processes can be initiated either during visualization or management of a business document. Selecting such an operation invokes business process that internally many be short running or long running. The distinction is hidden from the user by user interface subsystem 236.

Although the present invention has been described with reference to particular embodiments, workers skilled in the art will recognize that changes may be made in form and detail without departing from the spirit and scope of the invention.

What is claimed is:

1. A method of performing a computer implemented business process, comprising:
   initiating an application framework to provide services to the business process;
   describing the business process in a metadata structure of the application framework by describing business sub-processes, and an order in which the business sub-processes are to be performed to accomplish the business process, in a non-imperative process description language, wherein each business sub-process comprises a series of multiple pre-defined isolated operations, is written in an imperative programming language, and is defined independently of the business process;
   modifying metadata via the application framework such that the order of the business process is modified without changing individual business sub-processes;
   interpreting the process description language to instantiate the business sub-processes in the described order to instantiate the business process;
   storing the instantiated business process in a computer storage medium; and
   initiating the instantiated business process via a processor coupled to the computer storage medium.

2. The method of claim 1 wherein initiating the instantiated business process comprises:
   receiving a process initiation input; and
   initiating the instantiated business process based on the process initiation input.

3. The method of claim 2 wherein receiving the process initiation input comprises:
   receiving an automated input from an external component.

4. The method of claim 2 wherein receiving the process initiation input comprises:
   receiving a user input.

5. The method of claim 1 wherein describing the business process comprises:
   describing the business process in a text file.

6. The method of claim 1 wherein each business sub-process specifies a plurality of pre-defined isolated operations, wherein each pre-defined isolated operation, when performed by the computer, performs an isolated, granular piece of work.

7. A system comprising:
   a processor;
   a memory coupled to the processor;
   a business framework module comprising a set of instructions stored in the memory and executable by the processor to enable a user to design components for business applications; and
   wherein the business framework module further comprises:
      a set of business class libraries that provide a number of common entities which contain properties for the business applications;
      a tools subsystem that includes:
         a plurality of design subsystems to design the components for the business applications,
         a test service to test the components, and
         an application packager to package the components into an application; and
      a business application framework that provides a programming model and services for writing the business applications, wherein the business applications each comprise a metadata structure describing business sub-processes, and an order in which the business sub-processes are to be performed to accomplish the business process, in a non-imperative process description language, wherein each business sub-process comprises a series of multiple pre-defined isolated operations, is written in an imperative programming language, and is defined independently of the business process.

8. The system of claim 7 wherein the components comprise processes, reports, and user interfaces for business applications.

9. The system of claim 7 wherein the business class libraries further include data types and patterns.

10. The system of claim 7 wherein each of the operations being executable within an expected time-out period.

11. A computer storage medium having instructions to cause a processor to perform a method comprising:
    initiating a business framework;
    designing components for business applications via the business framework; and
    producing an application including the components;
    wherein the business framework comprises:
        a set of business class libraries that provide a number of common entities which contain properties for the business applications;
        a tools subsystem that includes:
            a plurality of design subsystems to design the components for the business applications,
            a test service to test the components, and
            an application packager to package the components into an application; and
        a business application framework that provides a programming model and services for writing the business applications, wherein the business applications each comprise a metadata structure describing business sub-processes, and an order in which the business sub-processes are to be performed to accomplish the business process, in a non-imperative process description language, wherein each business sub-process comprises a series of multiple pre-defined isolated operations, is written in an imperative programming language, and is defined independently of the business process.

12. The computer storage medium of claim 11 further having instructions to cause a processor to perform a method comprising:
    performing a computer implemented business process based on the metadata; and
    modifying the order of the metadata such that the business process is modified without changing individual business sub-processes.

13. The computer storage medium of claim 12 further having instructions to cause a processor to perform a method comprising:
    arranging stop points within the plurality of business sub-processes, wherein, during execution, the business process waits at the stop points for an external input prior to continuing; and
    wherein the stop points are configurable via the metadata.

14. The computer storage medium of claim 7 wherein the business application framework further comprises a programming model and services for modifying the order of the metadata such that the business process is modified without changing individual business sub-processes.

* * * * *